(12) United States Patent
Chen et al.

(10) Patent No.: US 11,351,640 B2
(45) Date of Patent: Jun. 7, 2022

(54) CUTTING TOOL

(71) Applicant: Nanjing Chervon Industry Co., Ltd., Nanjing (CN)

(72) Inventors: Zhifeng Chen, Nanjing (CN); Zhigang Pan, Nanjing (CN); Yang Cao, Nanjing (CN); Yu Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 846 days.

(21) Appl. No.: 16/219,507

(22) Filed: Dec. 13, 2018

(65) Prior Publication Data

US 2019/0118317 A1 Apr. 25, 2019

Related U.S. Application Data

(63) Continuation of application No. PCT/CN2017/088232, filed on Jun. 14, 2017.

(30) Foreign Application Priority Data

Jun. 30, 2016 (CN) .......................... 201610514547.2
Jun. 30, 2016 (CN) .......................... 201610515166.6
(Continued)

(51) Int. Cl.
*B23Q 11/10* (2006.01)
*B23Q 3/00* (2006.01)
(Continued)

(52) U.S. Cl.
CPC .............. *B23Q 3/005* (2013.01); *B23Q 11/10* (2013.01); *B26D 1/18* (2013.01); *B26D 7/0006* (2013.01);
(Continued)

(58) Field of Classification Search
CPC ......................... B23Q 11/10; B23Q 2240/002; B26D 7/0006; B26D 7/01; B27B 27/04;
(Continued)

(56) References Cited

U.S. PATENT DOCUMENTS

| 1,896,924 A | * | 2/1933 | ulrich | ..................... B23Q 3/005 83/441 |
| 2,601,878 A | * | 7/1952 | Anderson | ............... B27B 27/06 83/471.3 |

(Continued)

FOREIGN PATENT DOCUMENTS

| CN | 2386944 Y | 7/2000 |
| CN | 201320807 Y | 10/2009 |

(Continued)

OTHER PUBLICATIONS

ISA/CN, International Search Report issued on PCT application No. CN2017/088232, dated Sep. 18, 2017, 3 pages.

*Primary Examiner* — Evan H MacFarlane
*Assistant Examiner* — Liang Dong
(74) *Attorney, Agent, or Firm* — Greenberg Traurig, LLP

(57) ABSTRACT

Provided is a cutting tool that includes a cutting head, a frame, a working table, a guiding rail assembly, and a fence. The cutting head is configured to perform a cutting function. The frame is configured to support the cutting head. The working table is configured to place an object to be cut. The guiding rail assembly is configured to enable the working table to slide along a first straight line relative to the frame. The fence is mounted to the working table, includes at least one fence surface extending in a direction perpendicular to the first straight line. The cutting tool enables a workpiece to be cut to be stably placed on the working table during a cutting operation.

18 Claims, 31 Drawing Sheets

(30) Foreign Application Priority Data

| Jun. 30, 2016 | (CN) | 201610515884.3 |
| Jun. 30, 2016 | (CN) | 201620690729.0 |
| Jun. 30, 2016 | (CN) | 201620691952.7 |

(51) Int. Cl.

| B27B 27/04 | (2006.01) |
| B28D 7/04 | (2006.01) |
| B28D 1/04 | (2006.01) |
| B28D 7/02 | (2006.01) |
| B26D 1/18 | (2006.01) |
| B26D 7/00 | (2006.01) |
| B26D 7/01 | (2006.01) |

(52) U.S. Cl.
CPC ............. *B26D 7/01* (2013.01); *B27B 27/04* (2013.01); *B28D 1/047* (2013.01); *B28D 7/02* (2013.01); *B28D 7/04* (2013.01); *B23Q 2240/002* (2013.01)

(58) Field of Classification Search
CPC . B28D 1/047; B28D 7/02; B28D 7/04; B23D 47/025
USPC .......................................... 144/287
See application file for complete search history.

(56) References Cited

U.S. PATENT DOCUMENTS

| 2,697,458 | A  | * | 12/1954 | Franke   | B23Q 1/74    |
|           |    |   |         |          | 83/471       |
| 6,752,139 | B2 | * | 6/2004  | Lee      | B23D 47/025  |
|           |    |   |         |          | 125/12       |
| 7,926,477 | B2 | * | 4/2011  | Li       | B28D 7/04    |
|           |    |   |         |          | 125/13.01    |
| 8,656,902 | B2 | * | 2/2014  | Wei      | B23D 47/025  |
|           |    |   |         |          | 125/35       |
| 9,833,929 | B2 | * | 12/2017 | Chen     | B28D 1/047   |
| 2004/0134324 | A1 | * | 7/2004 | Sheddy   | B27B 5/38    |
|           |    |   |         |          | 83/581       |
| 2011/0232620 | A1 | * | 9/2011 | Cao      | B28D 7/02    |
|           |    |   |         |          | 125/13.01    |
| 2011/0298263 | A1 | * | 12/2011 | Bateman | A47C 4/025   |
|           |    |   |         |          | 297/338      |
| 2014/0261367 | A1 | * | 9/2014 | Ipatenco | B28D 1/04    |
|           |    |   |         |          | 125/13.01    |
| 2014/0352680 | A1 |   | 12/2014 | Chen    |              |

FOREIGN PATENT DOCUMENTS

| CN | 201659636 U | 12/2010 |              |
| CN | 205853114 U | 1/2017  |              |
| CN | 205853115 U | 1/2017  |              |
| EP | 1946870 A1 * | 7/2008 | ........... B23D 59/001 |
| WO | 99/47323 A1 | 9/1999  |              |

\* cited by examiner

CUTTING TOOL

CROSS-REFERENCE TO RELATED APPLICATIONS

This application is a continuation of international application No. PCT/CN2017/088232 filed on Jun. 14, 2017, which claims the benefit and priority of Chinese patent application No. 201610514547.2 filed on Jun. 30, 2016, Chinese patent application No. 201610515166.6 filed Jun. 30, 2016, Chinese patent application No. 201610515884.3 filed Jun. 20, 2016, Chinese patent application No. 201620690729.0 filed Jun. 30, 2016 and Chinese patent application number 201620691952.7 filed Jun. 30, 2016. All applications are incorporated herein in their entirety by reference.

TECHNICAL FIELD

The present disclosure relates to a cutting tool, and in particular to a tile saw.

BACKGROUND

A vertical tile saw is a cutting tool configured to cut objects such as tiles, marble and the like, which has gained widespread favoring among users. Such a cutting tool typically includes a cutting head, a frame, a working table, a bracket, and the like. The working table is formed with a working table surface used for placing an object to be cut. When performing a cutting operation, however, the object is subjected to a relatively great force from the cutting head, such that the object is easily moved on the working table, adversely affecting the cutting effect.

SUMMARY

In order to solve the deficiencies of the prior art, the present disclosure provides a cutting tool capable of stably supporting an object to be cut.

In order to achieve the above objectives, the present disclosure adopts the following technical solutions.

A cutting tool, including a cutting head, a frame, a working table, a guiding rail assembly and a fence. The cutting head is configured to cut an object. The frame is configured to support the cutting head. The working table is configured to place an object to be cut. The guiding rail assembly is configured to enabling the working table to slide along a first straight line relative to the frame. The fence is mounted to the working table, and the fence comprises at least one fence surface extending in a direction perpendicular to the first straight line.

In one or more embodiments, the cutting tool further includes a water basin and a water tray. The water basin is configured to store water. The water tray is at least partially disposed between the cutting head and the water basin. The water tray at least partially runs beyond the water basin along a direction of the first straight line.

In one or more embodiments, the water tray is formed or coupled with a guide portion. The guide portion is configured to guide the water tray to slide relative to the water basin in a direction parallel to the first straight line.

In one or more embodiments, the water tray includes a main water tray and an extension water tray. The main water tray is joined with the guiding rail assembly via a slidable connection. The extension water tray is joined with the main water tray via a rotatable connection, and an rotating axis of the extension water tray rotating relative to the main water tray is parallel to the first straight line.

In one or more embodiments, the main water tray includes a water tray body and a water tray water retaining portion. The water tray body includes a water tray bottom surface parallel to a table surface of the table. The water tray water retaining portion extends from the water tray bottom surface away from the water basin. The water tray water retaining portion further includes a curved surface curved toward the cutting head, the curved surface is located at an end of the water tray bottom surface away from the cutting head.

In one or more embodiments, the cutting tool further includes an extension table. The extension table is configured to be detachably mounted to a left side of the working table or a right side of the working table. The working table is formed with a right mounting structure and a left mounting structure. The right mounting structure is configured to mount the extension table to the right side of the working table with a manner that the front surface faces upward. The left mounting structure is configured to mount the extension table to the left side of the working table with a manner that the rear surface faces upward. The extension table includes or is connected with a locking structure. The locking structure is configured to mate with the right mounting structure and the left mounting structure to lock the connection of the working table and the extension table.

In one or more embodiments, the cutting tool further includes an angle guide assembly. The angle guide assembly is detachably mounted to the working table. The angle guide assembly includes a slider and an angle guide body. The slider is slidably mounted to the working table. The angle guide body is joined with the slider via a rotatable connection. The working table is provided with a main chute. The main chute is configured to guide the slider to slide. The front surface of the extension table is provided with a front chute. The front chute is configured to dock with the main chute to enable the slider to slide to the extension table when the expansion table is mounted to the right side of the working table with the front surface facing upward. The rear surface of the extension table is provided with a rear chute. The rear chute is configured to dock with the main chute to enable the slider to slide to the extension table when the expansion table is mounted to the left side of the working table with the rear surface facing upward.

In one or more embodiments, the extension table is connected or formed with an extension fence. The extension fence is configured to stop the object to be cut on the extension table when the extension table is mounted to one side of the working table. The fence is substantially aligned with the extension fence when the extension table is mounted to the one side of the working table.

In one or more embodiments, a connection formed by the expansion fence and the extension table leads to the expansion fence having two mounting positions. When the expansion fence is located in one of the two mounting positions, the extension fence protrudes from the front surface of the extension table. When the expansion fence is located in the other of the two mounting positions, the extension fence protrudes from the rear surface of the extension table.

In one or more embodiments, the cutting tool further includes a supporting assembly. The supporting assembly is configured to support the object to be cut at a higher position than the working table. The supporting assembly includes two supporting legs and a contacting plate. The two supporting legs are rotatably connected to the working table.

The contacting plate is configured to directly contact the object to be cut, and the contacting plate is disposed between the two support legs.

In one or more embodiments, the cutting tool further includes a water basin, a movable member, a biased pressing member, and an operating member. The water basin is configured to store water. The movable member is joined with the frame via a movable connection that enables the movable member to switch between a first movable position and a second movable position. The biased pressing member is configured to press the movable member in a biased manner to move toward the first movable position. The operating member is configured to drive the movable member to overcome a biased press of the biased pressing member to move toward the second movable position when operated by a user. The water basin is further formed with a jointing portion, which is coupled with the movable member when the movable member is moved to the first movable position and is disengaged from the movable member when the movable member is moved to the second movable position.

In one or more embodiments, the frame includes a pair of transverse beams and a pair of longitudinal beams. One of the pair of beams supports the cutting head. The pair of longitudinal beams are connected between the pair of transverse beams. The operating member is disposed on the pair of longitudinal beams, and the movable member is disposed at an end portion of the pair of transverse beams.

In one or more embodiments, the operating member further includes a contacting portion, which is operative to simultaneously contact a hand of the user that is holding the pair of longitudinal beams. The contacting portion is at least partially exposed relative to the frame.

In one or more embodiments, the cutting tool further includes a linking member. The linking member includes an active portion connected with the operating member and a driven portion connected with the movable member. The movable member is a movable pin joined with the frame via a slidable connection. The jointing portion is a groove defined in the water basin and which is operative to be inserted by the movable member when the movable member moves to the first movable position.

In one or more embodiments, the cutting tool further includes an angle guide assembly. The angle guide assembly is slidably disposed on the working table along a second straight line. The angle guide assembly includes a guide disc, a guide pin and a guide rule. The guide disc is formed with a guiding rail. The guide pin is joined with the guide disc via a slidable connection, whereby the guide disc is operative to slide along a guiding path of the guiding rail. The guide rule is connected with the guide disc. The guide rule is formed with an abutment surface, and the abutment surface is perpendicular to the second straight line when the guide pin is in a first position inside the guiding rail and the abutment surface obliquely intersects with the second straight line when the guide pin is in a second position inside the guiding rail.

In one or more embodiments, the guiding path of the guiding rail extends along a circular arc.

In one or more embodiments, the working table is formed with a main chute that extends along the second straight line.

In one or more embodiments, the angle guide assembly further includes a slider. The slider is joined with the working table via a slidable connection that allows the slider to slide along a direction in which the main chute extends.

In one or more embodiments, the angle guide assembly further includes an insert. The insert includes an extension portion which is operative to extend along a direction perpendicular to the working table to contact one side of the working table when the slider slides to an edge of the working table.

In one or more embodiments, the guide rule is disposed on a side of the fence surface adjacent to the cutting head. The gird further defines a notch, at which are formed a first auxiliary surface running parallel to or coinciding with the abutment surface and a second auxiliary surface perpendicular to the first auxiliary surface.

In one or more embodiments, the cutting tool further includes an angle guide assembly, and the angle guide assembly is detachably mounted on the working table. The angle guide assembly includes an angle guide body, a connecting block and a locking member. The angle guide body is provided with a guiding plane obliquely intersecting a direction of the first straight line. The connecting block is configured to engage with a top of the fence or an edge of the working table. The locking member is configured to lock a position of the connecting block relative to the fence or the table.

In one or more embodiments, the connecting block is joined with the angle guide body via a rotatable connection.

In one or more embodiments, the locking member is rotatably connected to the connecting block. The locking member passes through the connecting block and is movable inside the connecting block.

In one or more embodiments, the connecting block is provided with a slot and a guiding groove. The slot is defined by a limiting slot wall. The guiding groove is passed through by the locking member and guides a rotation of the locking member. The locking member extends into the slot through the guiding groove and is rotatable to a position opposite to the limiting slot wall to clamp the fence from both sides.

In one or more embodiments, the slot further forms a stepping structure at the limiting slot wall. The stepping structure defines a limiting surface. The locking member is rotatable to a position corresponding to a rebate of the slot to cooperate with the limiting surface to clamp the working table.

In one or more embodiments, a wall surface of the limiting slot wall and the limiting surface are both parallel to an axis of rotation of the connecting block relative to the angle guide body.

In one or more embodiments, the angle guide assembly further includes an insert and a guide frame. The insert is passed through by the locking member and enables the locking member to move inside the slot when the user rotates the locking member. The guide frame is disposed outside the connecting block. The insert is disposed between the guide frame and the connecting block.

The present disclosure provides an advantage in that the fence surface is perpendicular to the first straight line thereby enabling a workpiece to be cut to be stably placed on the working table during a cutting operation.

DETAILED DESCRIPTION

The present disclosure will be further described below in conjunction with the drawings and specific embodiments.

Figure 1:
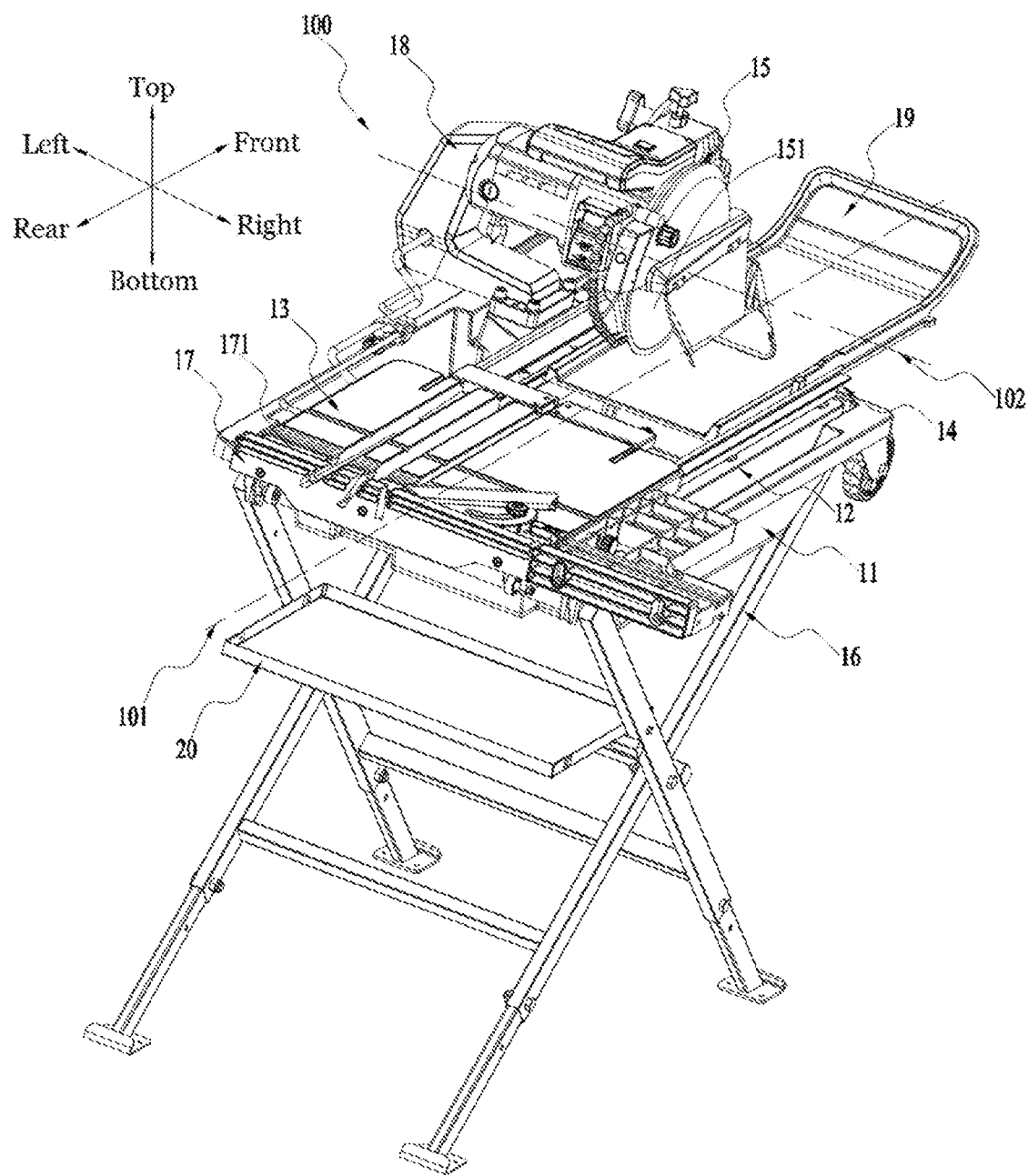
FIG. 1 is a perspective structural view diagram of the cutting tool according to an embodiment of the present disclosure.
Figure 2:
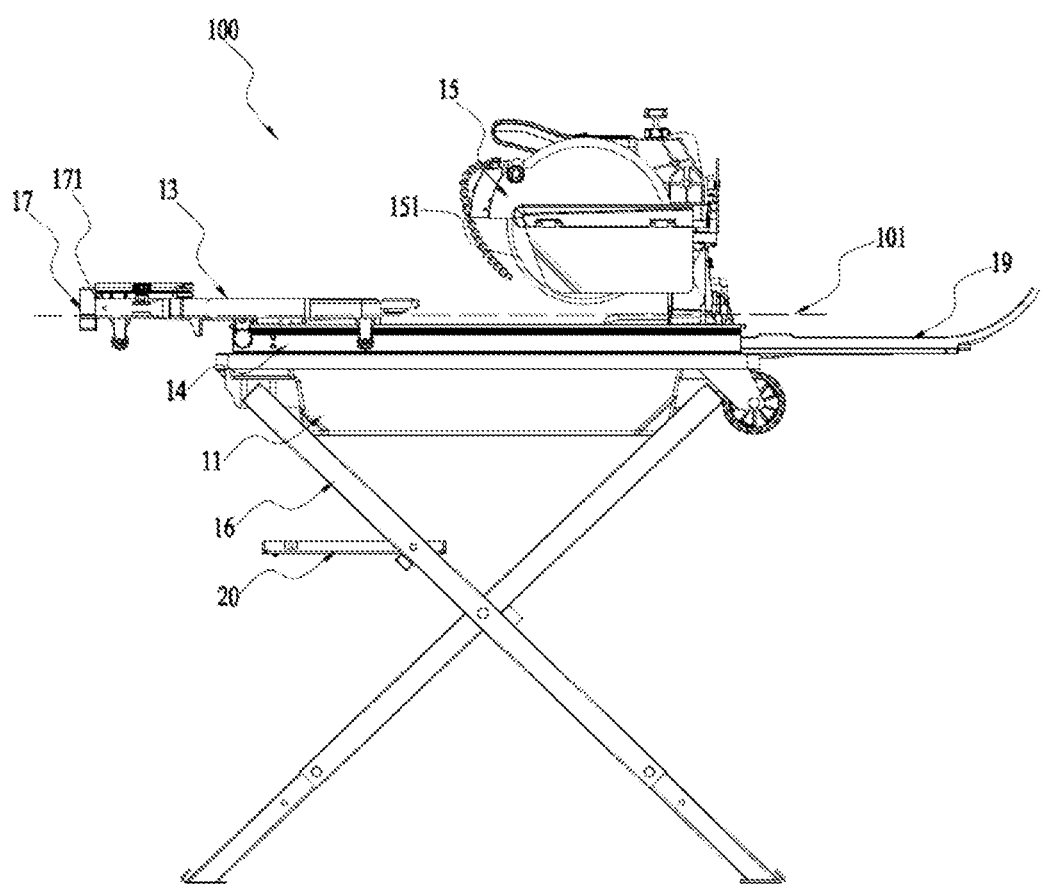
FIG. 2 is a side view of the cutting tool in FIG. 1.

As illustrated in FIGS. 1 and 2, a cutting tool 100 according to a first embodiment includes a water basin 11, a frame 12, a working table 13, a guiding rail assembly 14, a cutting head 15, a bracket 16, and a fence 17. The cutting tool 100 is a tile saw, which can be used for cutting objects such as tiles and marbles. To facilitate the description of the corresponding technical solution, there is defined in the present disclosure a top side, a bottom side, a front side, a rear side, a left side, and a right side of the cutting tool 100. It should be noted that "top" and "bottom" in the present disclosure refer to the position of one part or structure relative to another part or structure, and is not limited to the vertical upward and vertical downward in a strict sense.

The water basin 11 is configured to store water for cooling the cutting head 15. During the cutting process, the water stored in the water basin 11 dissipates the cutting head 15 in time; and the water basin 11 receives water splashed from the cutting head 15, thereby avoiding soiling the ground and ensuring cleanness sanitation. In addition, the water basin 11 is also capable of receiving waste generated during the cutting process.

The frame 12 is configure to support the cutting head 15, and the frame 12 is mounted on the water basin 11. In order to support the cutting head 15, the cutting tool 100 further includes a supporting arm 18 for directly supporting the cutting head 15, and both ends of the supporting arm 18 are respectively connected to the frame 12 and the cutting head 15, such that the cutting head 15 is supported on the frame 12.

The working table 13 is configured to place an object to be cut, and the working table 13 is further connected to the frame 12. In one or more embodiments, the working table 13 is slidably mounted to the guiding rail assembly 14 along a first straight line 101, and the guiding rail assembly 14 is mounted to the frame 12. Thus, the working table 13 may be moved toward the cutting head 15 along the first straight line 101 with respect to the entirety of the cutting head 15, the frame 12 and the guiding rail assembly 14, thereby facilitating the movement of the object toward the cutting head 15.

The cutting head 15 is configured to perform a cutting function, and the cutting head 15 is mounted to the frame 12. The cutting head 15 includes a cutting member 151 configured to cut an object. The cutting member 151 is rotatable about a first axis 102. For the tile saw, the cutting member 151 may be a circular saw blade capable of cutting tiles, marble, and the like.

The bracket 16 is configured to support the water basin 11 so that the cutting tool 100 is stably placed on the ground.

As illustrated in FIGS. 1 and 2, the fence 7 is mounted to the working table 13, and the fence includes a fence surface 171 configured to abut against the object. The fence surface 171 extends along a direction perpendicular to the first straight line. Thus, when the object is placed on the working table 13 and slides with the working table 13 along the first straight line 101, the object will subject a resistance of the cutting member 151 in the advancing direction along the first straight line 101. While the object is simultaneously subjected to a force opposite to the resistance by the abutment of the fence surface 171, the object may be stably placed on the working table 13, and the object is prevented from moving, thereby improving the cutting effect. Further, the fence 17 is disposed at an edge of the working table 13.

The cutting tool 100 further includes a water tray 19 and a storing tray 20. The water tray 19 is disposed between the cutting head 15 and the water basin 11, and the water tray 19 is further disposed between the working table 13 and the water basin 11. Along the first straight line 101, the water tray 19 further partially protrudes the water basin 11, and the water tray 19 protrudes the water basin 11 on a front side of the water basin 11. Thus, the water tray 19 may be configured to stop the water splashed from the cutting head 15 from reaching the front side, and the water tray 19 then directs the water into the water basin 11 to reduce the water splashed from the cutting head 15 to the ground, thereby ensuring cleanliness of the working environment. The storing tray 20 is mounted on the bracket 16, and the storing tray 20 is configured to place some tool attachments that may be used during operation, such as a tape measure, a screw, a screwdriver, and the like. The storing tray 20 further forms a rotatable connection with the bracket 16, so that when the user does not need to use the storing tray 20, the storing tray 20 may be rotated to a position where the occupied space is small, thereby facilitating storage and storage.

Figure 3:
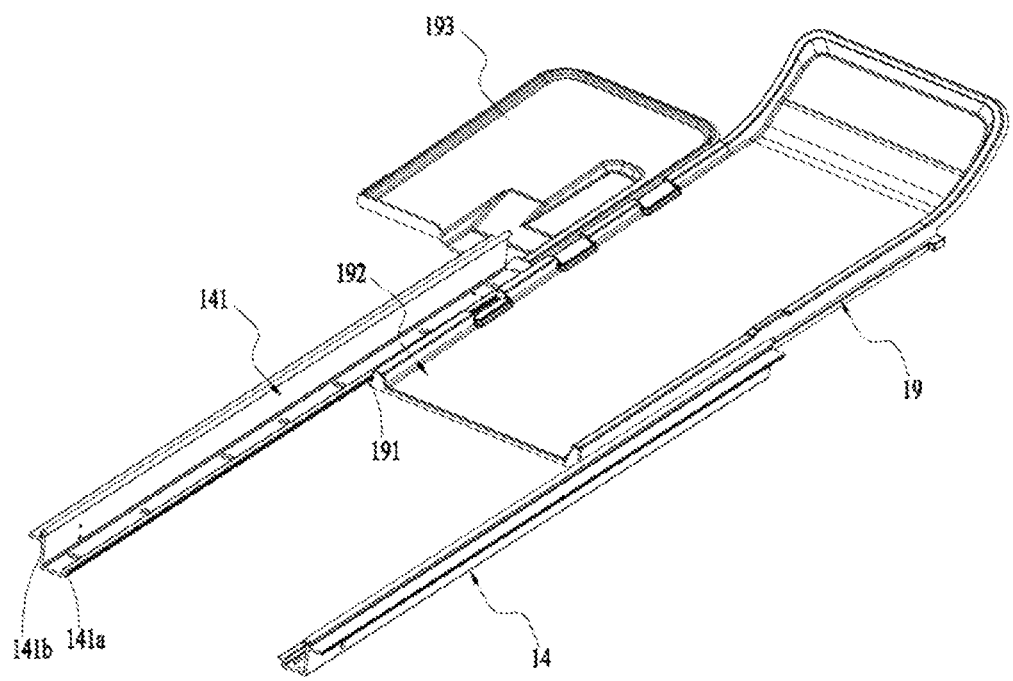
FIG. 3 is a schematic structure diagram of the water tray and the guiding rail assembly in FIG. 1.

As illustrated in FIG. 3, the water tray 19 is mounted to the guiding rail assembly 14, and the water tray 19 is further connected with the guiding rail assembly 14 via a slidable connection. The water tray 19 is formed with a guiding portion 191, which may guide the water tray 19 to slide relative to the guiding rail assembly 14, and the sliding direction is parallel to the first straight line 101. In one or more embodiments, the guiding rail assembly 14 includes two guiding rails 141, each of which is formed with an inner rail portion 141a and an outer rail portion 141b. The inner rail portion 141a is configured to engage with the guiding portion 191 of the water tray 19, so that the water tray 19 and the guiding rail assembly 14 are joined via a slidable connection. The outer rail portion 141b is f configured to engage with the working table 13, so that the working table 13 and the guiding rail assembly 14 are joined via a slidable connection along the first straight line 101.

For the water tray 19, it includes a main water tray 192 and an expansion water tray 193. The main water tray 192 is disposed between the two guiding rails 141, and each of a left side of the main water tray 192 and a right side of the main water tray 192 forms a guiding portion 191, so that the main water tray 192 and the guiding rail assembly 14 constitute a slidable connection. The expansion water tray 193 is configured to enlarge the water retaining area of the water tray 19. The expansion water tray 193 is installed on the left side of the main water tray 192 or the right side of the main water tray 192, here taking the left side as an example, and the expansion water tray 193 protrudes the water basin 11 on a left side of the water basin 11. The expansion water tray 193 further forms a rotatable connection with the main water tray 192, and a rotary shaft axis of the rotatable connection formed by the expansion water tray 193 and the main water tray 192 is parallel to the direction of the first straight line 101. Thus, when the expansion water tray 193 is rotated relative to the main water tray 192, the expansion water tray 193 may be rotated at least to the position shown in FIG. 4 and the position shown in FIG. 5. When the expansion water tray 193 is rotated to the position shown in FIG. 4, the expansion water tray 193 is inclined with the main water tray 192, and at this time, the expansion water tray 193 may stop the water splashed by the cutting head 15 toward the expansion water tray 193. When the expansion water tray 193 is rotated to the position shown in FIG. 5, the expansion water tray 193 is substantially and completely located on an upper side of the main water tray 192. At this time, a projection of the expansion water tray 193 on the plane S where the table surface of the working table 13 is located within the range of a projection of the main water tray 192 on the plane S, so that the water retaining area of the water tray 19 is smaller than the water retaining area shown in FIG. 4. In addition, when the expansion water tray 193 is rotated to the position shown in FIG. 5, the expansion water tray 193 is located between the two guiding rails 141, so that the expanded water tray 183 may slide with the main water tray 192 respect to the guiding rail assembly 14. Therefore, a size of the portion of the water tray 19 protrudes the water basin 11 is reduced, and the space in which the cutting tool 100 is located is reduced, thereby facilitating the user's storage.

Figure 4:
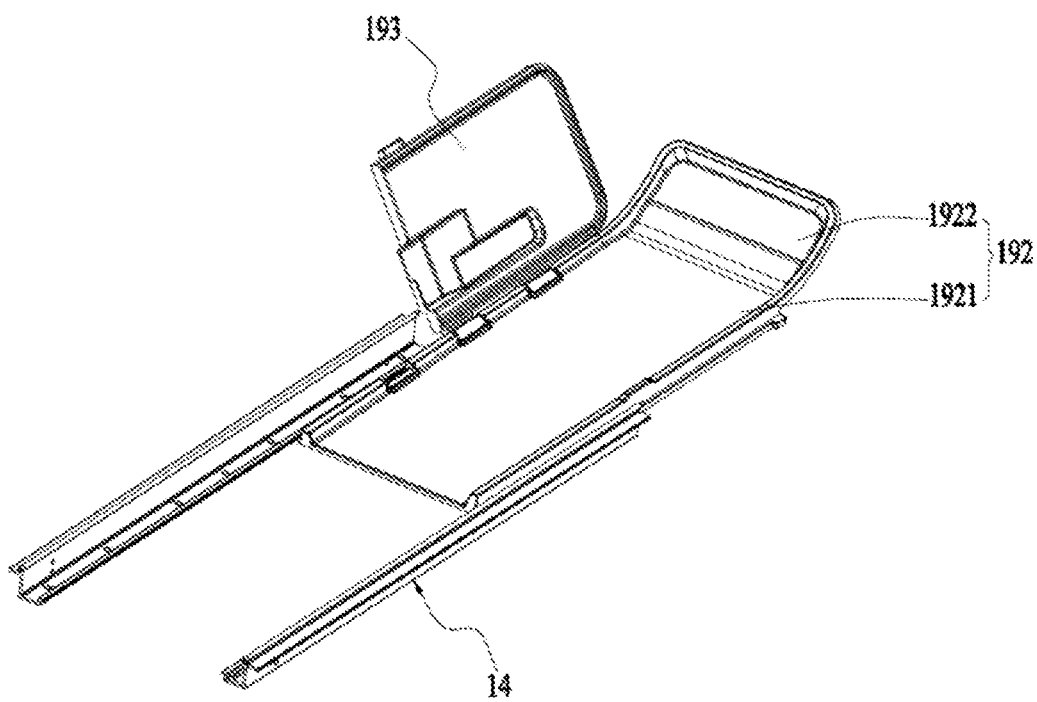
FIG. 4 is a schematic structure diagram of the structure shown in FIG. 3 when the expansion water tray is rotated to be inclined with the main water tray.
Figure 5:
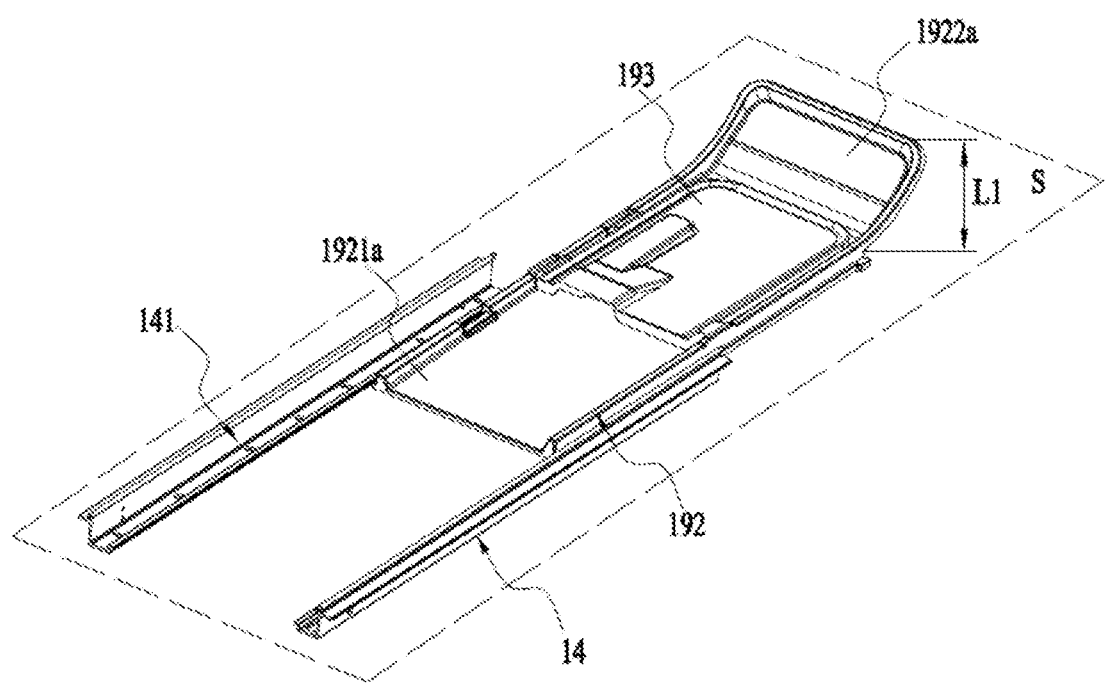
FIG. 5 is a schematic structure diagram of the structure shown in FIG. 3 when the expansion water tray is rotated to the upper side of the main water tray.

As illustrated in FIGS. 3 to 5, the main water tray 192 includes a water tray body 1921 and a water tray water retaining portion 1922. The water tray body 1921 is formed with a water tray bottom surface 1921a parallel to the table surface of the working table 13, and the water tray bottom surface 1921a is partially located at a lower side of the cutting head 15, so that the water splashed downward by the cutting head 15 may be stopped. The water tray water retaining portion 1922 extends from the water tray bottom surface 1921a away from the water basin 11, and the water tray water retaining portion 1922 may be integrally formed with the water tray body 1921. The water tray water retaining portion 1922 is capable of extending obliquely upward from a front side of the water tray body 1921. The water tray retaining portion 1922 is further formed with an curved surface 1922a. The curved surface 1922a is smoothly connected with the water tray bottom surface 1921a, and the curved surface 1922a is further located at one end of the water tray bottom surface 1921a away from the cutting head 15. The curved surface 1922a formed by the water tray retaining portion 1922 is also curved toward the cutting head 15, so that the water splashed by the cutting head 15 obliquely toward the curved surface 1922a is effectively stopped. In addition, a dimension L1 is a dimension of the water tray water retaining portion 1922 in the direction perpendicular to the table surface of the working table 13. The dimension L1 is greater than or equal to 80 mm and the dimension L1 is less than or equal to 150 mm, so that the height of the water tray water retaining portion 1922 is larger than a distance between the cutting head 15 and the water tray bottom surface 1921a, thereby increasing the water retention effect.

Figure 6:
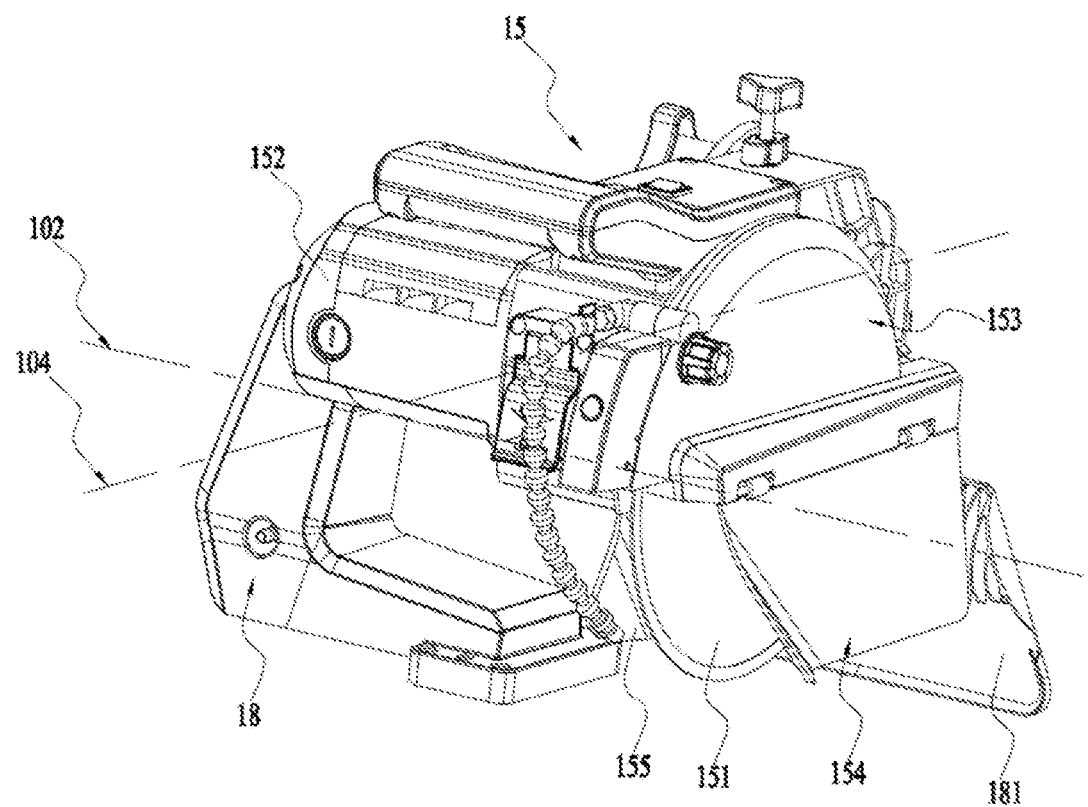
FIG. 6 is a schematic structure diagram of the cutting head and the support arm in FIG. 1.

As illustrated in FIG. 6, the cutting head 15 further includes a motor 152, a shield 153, a first water retaining member 154, and a second water retaining member 155. The motor 152 is configured to drive the cutting member 151 to rotate with the first axis 102 as an axis. A third water retaining 181 may also be mounted on the supporting arm 18, and the third water retaining 181 is located on a front side of the cutting member 151.

Figure 7:
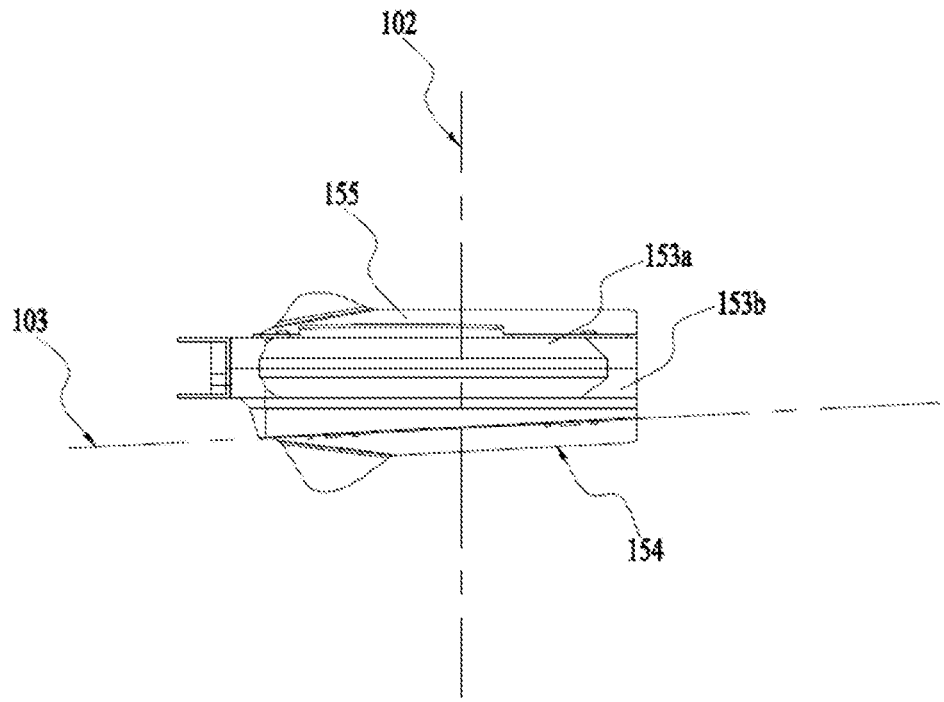
FIG. 7 is a side view of the cutting member, the shield, the first water retaining member and the second water retaining member in FIG. 6.
Figure 8:
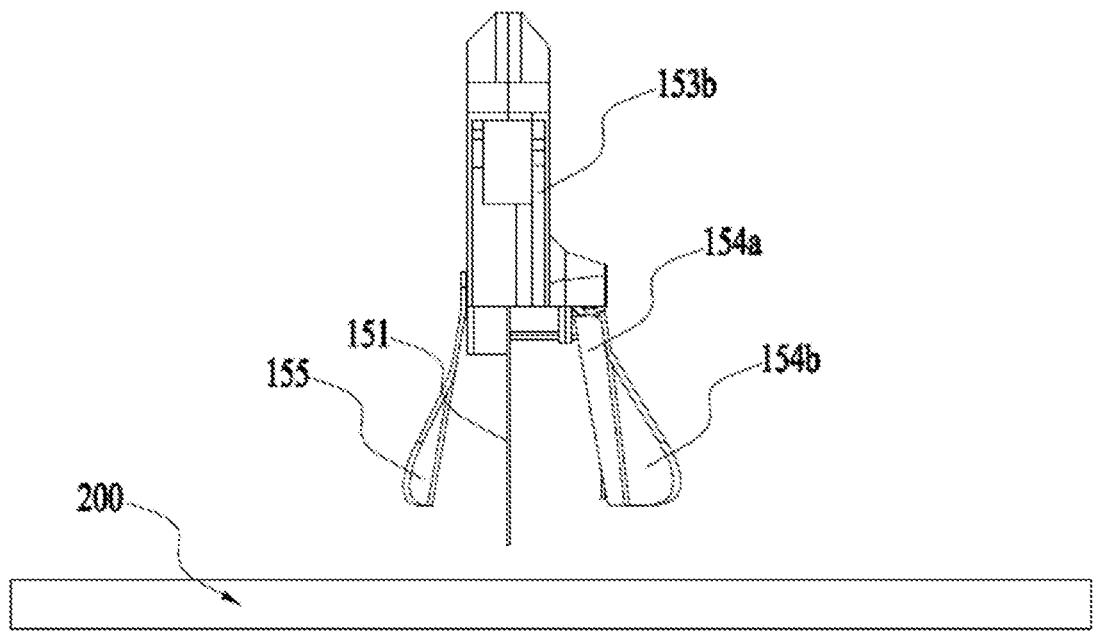
FIG. 8 is a schematic structure diagram of the structure shown in FIG. 7 when the cutting member does not cut the stone.

The shield 153 is configured to prevent the waste from splashing on the user during the cutting process, causing damage to the user. As shown in FIGS. 6 to 8, the shield 153 may include an inner shield portion 153a and an outer shield portion 153b, which are respectively disposed on both sides of the cutting member 151. Further, the inner shield portion 153a and the outer shield portion 153b are respectively disposed on a right side of the cutting member 151 and a left side of the cutting member 151, and the entire constituted by the inner shield portion 153a and the outer shield portion 153b may cover at least half of the cutting member 151.

The first water retaining member 154 is disposed to the outer shield portion 153b, and the second water retaining member 155 is disposed to the inner shield portion 153a. The first water retaining member 154 and the outer shield portion 153b constitute a rotatable connection that is pivoted with the second axis 103, and the second water retaining member 155 constitutes a fixed connection with the inner shield portion 153a. The second axis 103 of the first water retaining member 154 that rotates relative to the outer shield portion 153b is parallel to the table surface of the working table 13.

The cutting member 151 is provided with a cutting plane when cutting the object. For example, for a circular saw blade, the cutting plane is the plane that the surface of the circular saw blade located. A straight line an upper edge of the first water retaining member 154 located connected to the outer shield portion 153b is further formed an angle of more than 0 degrees and less than or equal to 20 degrees with the cutting plane of the cutting member 151. The straight line an upper edge of the first water retaining member 154 located may be understood as a direction of the second axis 103. Therefore, the second axis 103 and the cutting plane of the cutting member 151 form an oblique intersection.

The cutting head 15 is capable of forming a rotatable connection with the supporting arm 18, and the rotatable connection may rotate about a third axis 104. The third axis 104 is perpendicular to the first axis 102 that the cutting member 151 rotates about. Thus, when the cutting head 15 is rotated about the third axis 104 with respect to the supporting arm 18, the cutting member 151 may be rotated from the position shown in FIG. 8 to the position shown in FIG. 9, thereby enabling an oblique cutting of the object. For example, as shown in FIGS. 8 and 9, the cutting member 151 is capable of obliquely cutting the stone 200.

The first water retaining member 154 includes a water retaining body 154a and an extension portion 154b. The water retaining body 154a connects to the outer shield portion 153b, and the extension portion 154b is disposed at a corner of the water retaining body 154a. The extension portion 154b is integrally formed with the water retaining body 154a, and the extension portion 154b extends from the corner of the water retaining body 154a away from the cutting member 151. In essence, the extension portion 154b may be understood as a portion that is lifted at the corner of the water retaining body 154a. The second water retaining member 155 is disposed inside the cutting member 151, and the second water retaining member 155 may be made of soft rubber material.

Figure 9:
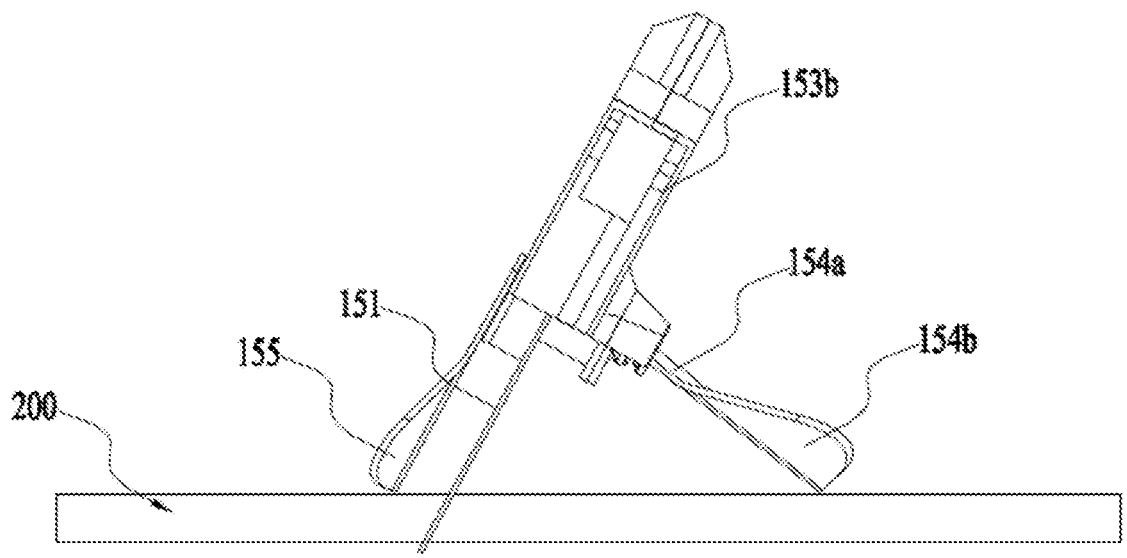
FIG. 9 is a schematic structure diagram of the structure shown in FIG. 7 when the cutting member cuts the stone.

When the cutting head 15 is rotated relative to the supporting arm 18 about the third axis 104 and the cutting member 151 is rotated to a position close to that shown in FIG. 9, the extension portion 154b is in contact with a surface of the stone 200. At this time, as the extension portion 154b lifts up relative to the water retaining body 154a, when the cutting member 151 continues to rotate to the position shown in FIG. 9, the extension portion 154b drives the first water retaining member 154 to rotate. The first water retaining member 154 is driven to be rotated about the third axis 104 relative to the outer shield portion 153b and rotated along a direction away from the cutting member 151, so that a lower edge of the first water retaining member 154 contacts to the stone 200. As shown in FIG. 9, the second water retaining member 155 is further in contact to the surface of the stone 200 under the force of gravity, so that the water splashed on the cutting member 151 is stopped by the first water retaining member 154 and the second water retaining member 155 on both sides of the cutting member 151.

Thus, under the joint action of the water tray 19, the first water retaining member 154, the second water retaining member 155 and the third water retaining member 181, the water splashed by the cutting head 15 can be relatively comprehensively stopped, which improves the effect of retaining water.

Figure 10:
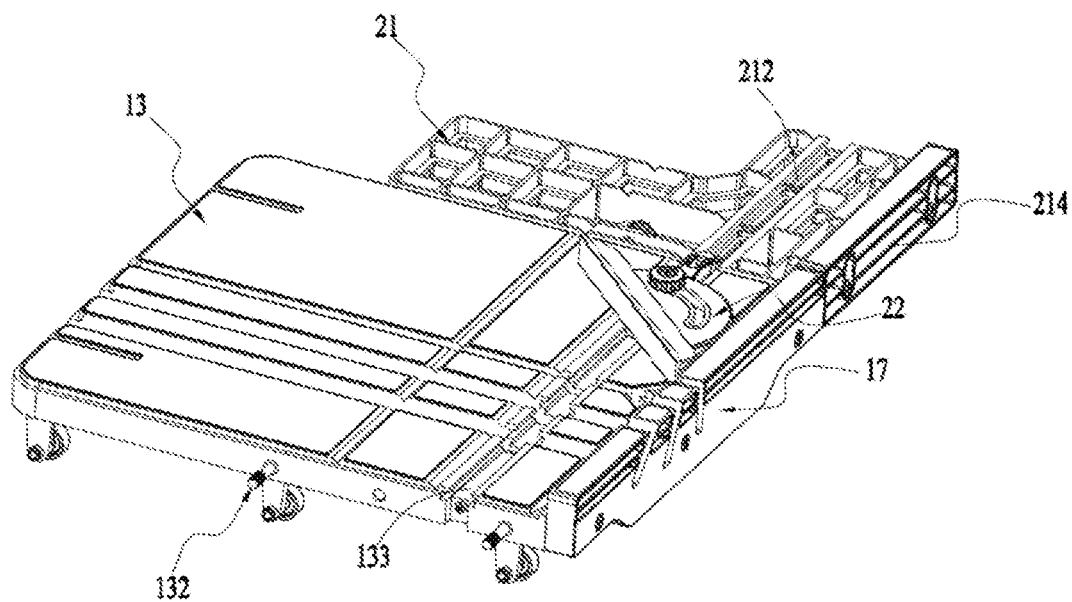
FIG. 10 is a schematic structure diagram of the working table and the extension table in FIG. 1 when the working table and the extension table are connected together.
Figure 11:
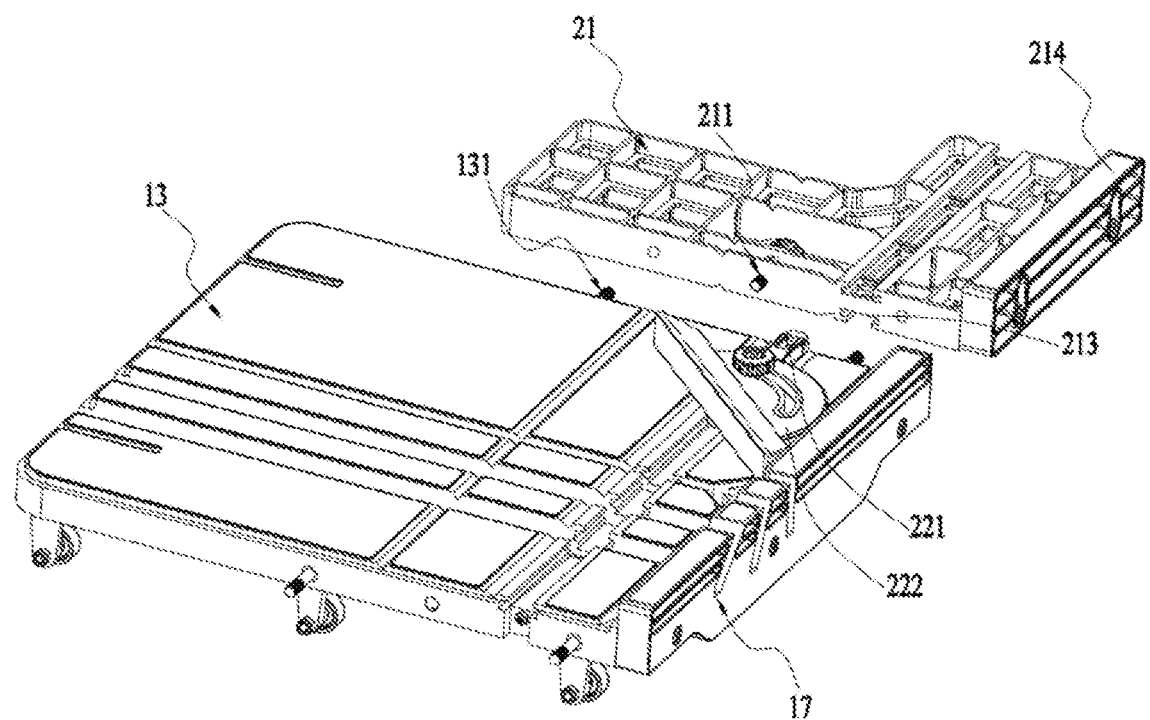
FIG. 11 is a schematic structure diagram of the working table and the extension table in FIG. 1 when the working table is separated from the extension table.

As illustrated in FIGS. 10 and 11, the cutting tool 100 further includes an extension table 21. The extension table 21 is configured to be mounted to the working table 13. The extension table 21 is capable of being detachably mounted to a right side of the working table 13. Thus, when the object placed on the working table 13 is large, the object may be stably supported by the extension table 21. A right side of the working table 13 forms a right mounting structure 131, and a left side of the working table 13 forms a left mounting structure 132. The left mounting structure 132 and the right mounting structure 131 are symmetrically disposed. Thus, the extension table is capable of being detachably mounted to the right side of the working table via the right mounting structure 131, and at this time, a front surface of the extension table faces upward. Similarly, the extension table 21 may also be disengaged from the right side of the working table 13, and then mounted on the left side of the working table 13 via the left mounting structure 132, and at this time, a rear surface of the extension table faces upward. The structure of the front surface and the rear surface of the extension table 21 may be set to be substantially the same.

The extension table 21 forms or connects with a locking structure 211, and the locking structure 211 may In one or more embodiments be a knob mounted on the extension table 21.

The locking structure 211 is configured to mate with the right mounting structure 131 and the left mounting structure 132 to lock the connection of the working table 13 and the extension table 21.

The right mounting structure 131 may include a screw that may be fixedly mounted to the right side of the working table 13. Correspondingly, a mounting hole is formed in the extension table 21, and the screw is capable of extending into the mounting hole. When the extension table 21 is mounted to the right side of the working table 13, firstly, the front surface of the extension table 21 faces upward, and then the screw is inserted into the mounting hole, and the connection of the extension table 21 and the working table 13 is locked by the locking structure 211. The left mounting structure 132 is the same as the right mounting structure 131, and details are not to be repeated herein again.

As illustrated in FIGS. 10 to 13, the working table 13 is further provided with an angle guide assembly 22. The angle guide assembly 22 is detachably mounted to the working table 13, and the angle guide assembly 22 includes a slider 221 and an angle guide body 222. The slider 221 is slidably mounted to the working table 13. The angle guide body 222 forms a rotatable connection with the slider 221. The working table 13 is provided with a main chute 133 configured to guide a sliding of the slider 221. The angle guide body 222 and the slider 221 form a rotatable connection. When the angle guide body 222 is rotated relative to the slider 221 to different positions, the object may be cut in different angles, for example a 45-degree cutting of the object.

The extension table 21 further forms a front chute 212 and a rear chute 213. The front chute 212 is disposed on the front surface of the extension table 21, and the rear chute 213 is disposed on the rear surface of the extension table 21. When the extension table 21 is mounted to the right side of the working table 13 with a manner that the front surface faces upward, the front chute 212 disposed on the front surface of the extension table 21 docks with the main chute 133 disposed on the working table 13, and enables the slider 221 to slide to the front chute 212 along the main chute 133. Thereby the angle guide assembly 22 may slide from the working table 13 to the extension table 21 mounted to the right side of the working table 13. When the extension table 21 is mounted to the left side of the working table 13 with a manner that the rear surface faces upward, the rear chute 213 disposed on the rear surface of the extension table 21 docks with the main chute 133 disposed on the working table 13, and enables the slider 221 to slide to the rear chute 213 along the main chute 133. Thereby the angle guide assembly 22 may slide from the working table 13 to the extension table 21 mounted to the left side of the working table 13.

The extension table 21 is further formed with an extension fence 214. When the extension table 21 is mounted to one side of the working table 13, the extension fence 214 may stop the object to be cut on the extension table 21, and the extension fence 214 is substantially aligned with the fence 17.

Figure 12:
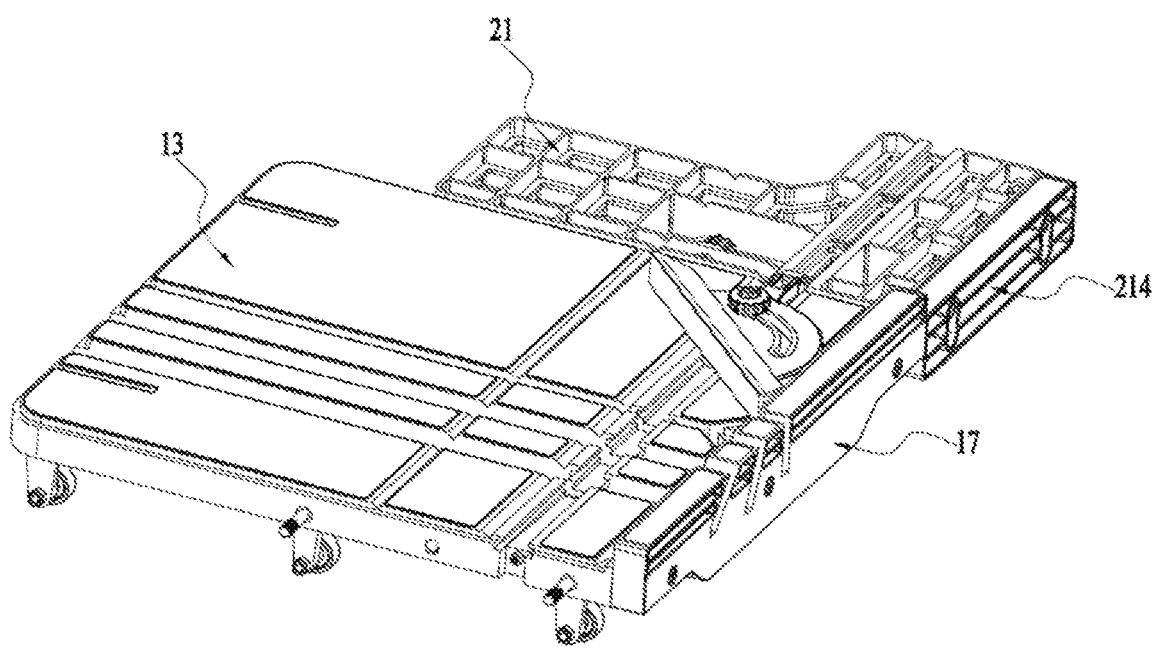
FIG. 12 is a schematic structure diagram of the structure shown in FIG. 10 when the extension fence protrudes from the rear surface of the extension table.
Figure 13:
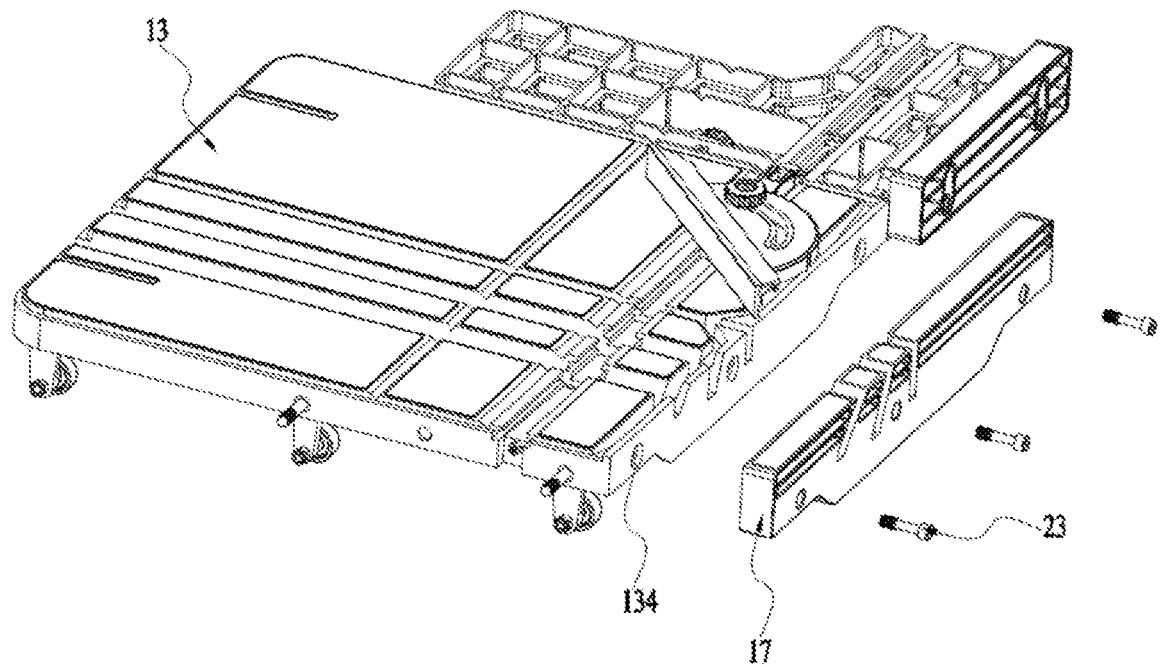
FIG. 13 is a schematic structure diagram of the structure shown in FIG. 10 when the fence is separated from the working table.

As illustrated in FIGS. 10 and 12, a connection formed by the expansion fence 214 and the extension table 21 leads to two mounting positions for the expansion fence 214. The extension fence 214 is movable in the up-down direction relative to the extension table 21 to the two mounting positions. When the expansion fence 214 is located in the mounting position shown in FIG. 10, the extension fence 214 protrudes from the front surface of the extension table 21, and the extension fence 214 may stop the object on the extension table 21. When the expansion fence 214 is located in the mounting position shown in FIG. 12, the extension fence 214 protrudes from the rear surface of the extension table 21. At the same time, the extension fence 214 may also be located below the front surface of the extension table 21 or flush with the front surface of the extension table 21, such that the object placed on the extension table 21 may not be stopped by the extension fence 214.

The fence 17 and the working table 13 form a detachable connection. A rear side of the working table 13 is formed with a threaded hole 134. The cutting tool 100 further includes a bolt 23, and the fence 17 is detachably mounted to the rear side of the working table 13 via a joint of the bolt 23 and the threaded hole 134.

Figure 14:
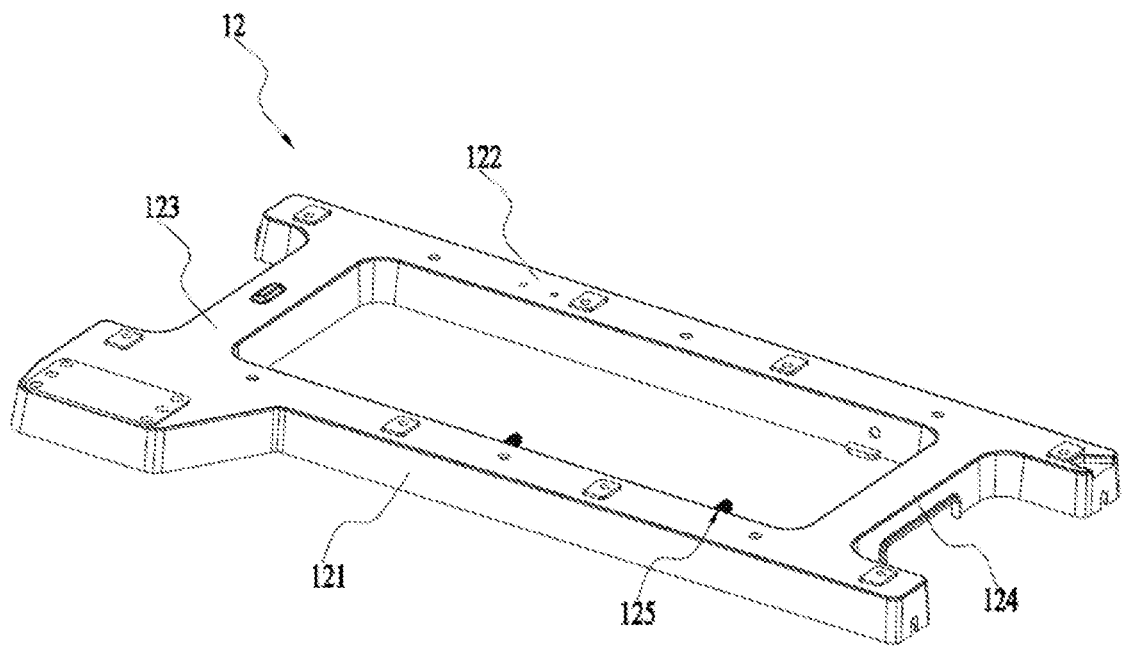
FIG. 14 is a schematic structure diagram of the frame in FIG. 1.
Figure 15:
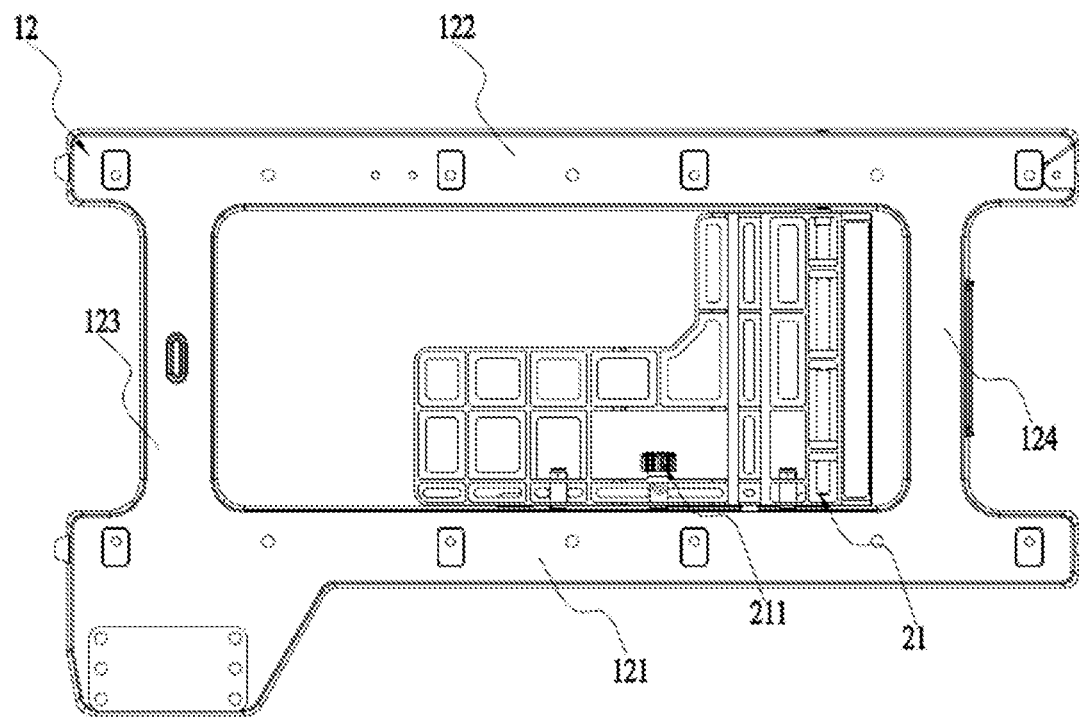
FIG. 15 is a schematic structure diagram of the cutting tool in FIG. 1 when the extension table is installed on the frame.

As illustrated in FIGS. 14 and 15, the frame 12 includes a pair of transverse beams and a pair of longitudinal beams. The pair of transverse beams may be arranged parallel to each other, and the pair of longitudinal beams may also be arranged parallel to each other. In one or more embodiments, the pair of transverse beams includes a first transverse beam 121 and a second transverse beam 122, and the pair of longitudinal beams includes a first longitudinal beam 123 and a second longitudinal beam 124. The first transverse beam 121 extends in a front-rear direction, the second transverse beam 122 is parallel to the first beam 121, the first longitudinal beam 123 extends in a left-right direction, and the second longitudinal beam 124 is parallel to the first longitudinal beam 123. The first longitudinal beam 123 and the second longitudinal beam 124 are further respectively connected between the first beam 121 and the second beam 122, and the first longitudinal beam 123 is perpendicular to the first transverse beam 121. An inner mounting structure 125 may also be formed on the first transverse beam 121, and the inner mounting structure 125 may cooperate with the locking structure 211 to mount the extension table 21 on the first transverse beam 121. Thereby, enabling the extension table 21 to be disposed between the first transverse beam 121 and the second transverse beam 122. At this time, the extension table 21 is located between the first longitudinal beam 123 and the second longitudinal beam 124. Thus, when the user does not need to use the extension table 21, the user may mount the extension table 21 on the first transverse beam 121, thereby reducing the space occupied by the cutting tool 100.

Figure 16:
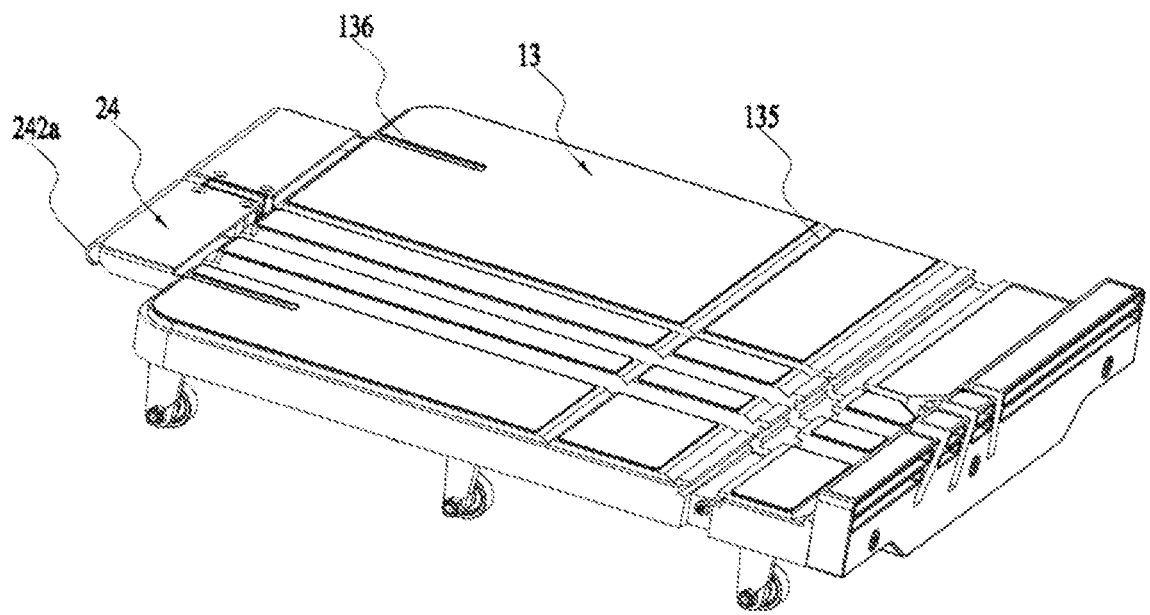
FIG. 16 is a schematic structure diagram of the working table and the supporting assembly in FIG. 1.
Figure 17:
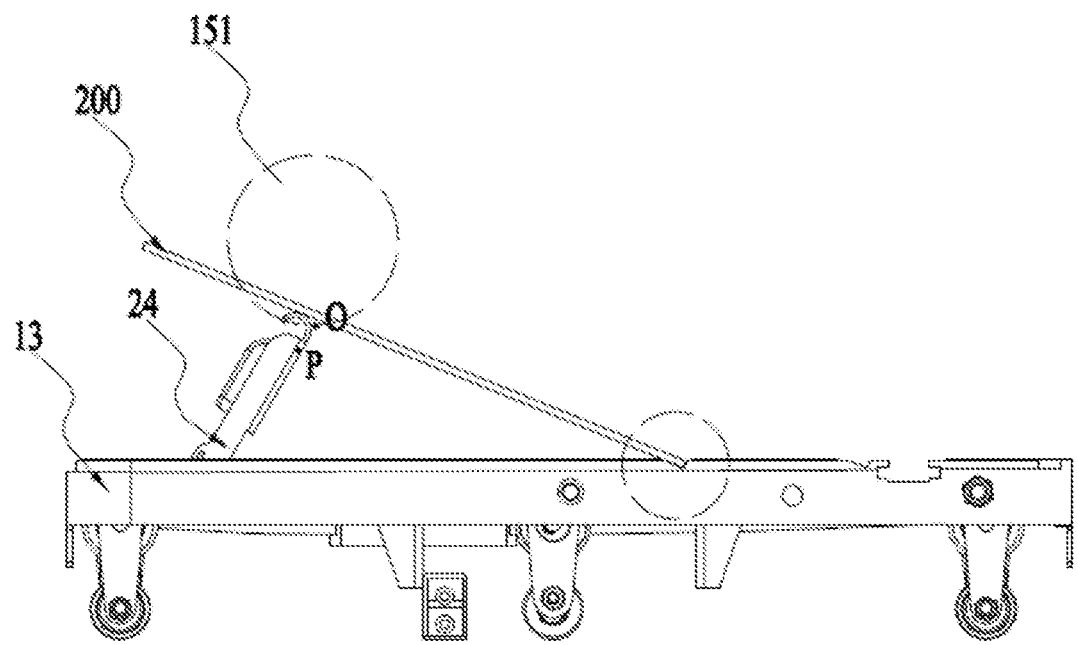
FIG. 17 is a schematic structure diagram of the structure shown in FIG. 16 when the supporting assembly supports the stone.
Figure 18:
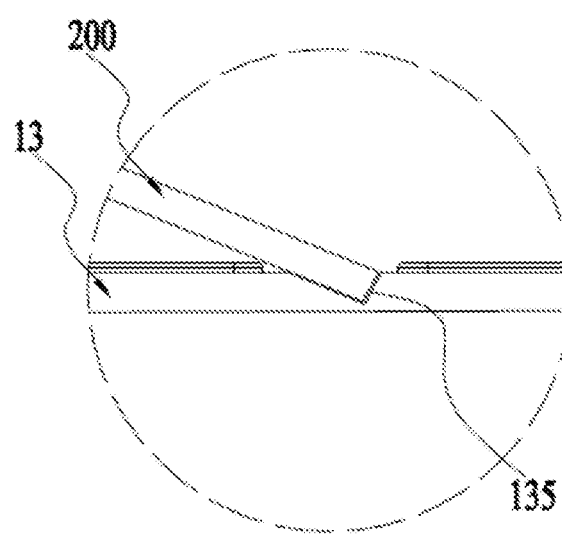
FIG. 18 is an enlarged schematic view of a portion of the structure in FIG. 17.
Figure 19:
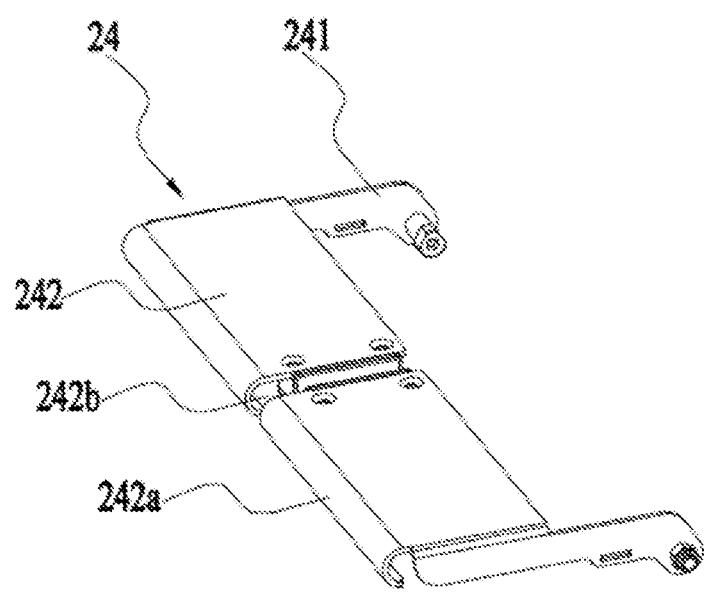
FIG. 19 is a schematic structure diagram of the supporting assembly in FIG. 16.
Figure 20:
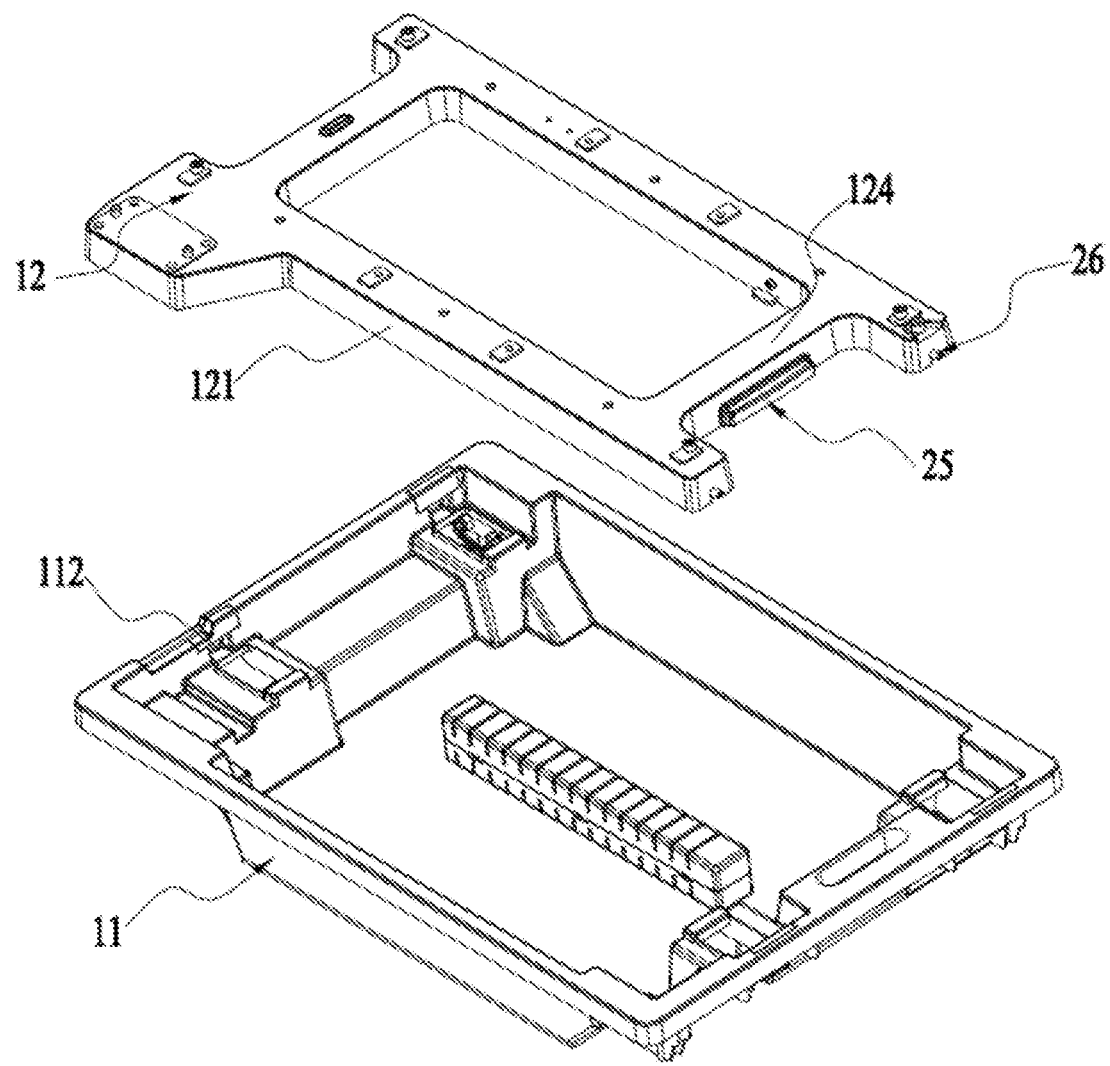
FIG. 20 is a schematic structure diagram of the cutting tool in FIG. 1 when the frame is separated from the water basin.
Figure 21:
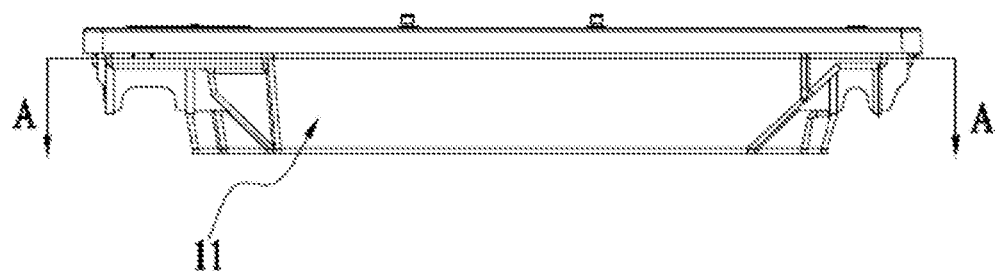
FIG. 21 is a side view of the cutting tool in FIG. 1 when the frame and the water basin are connected together.
Figure 22:
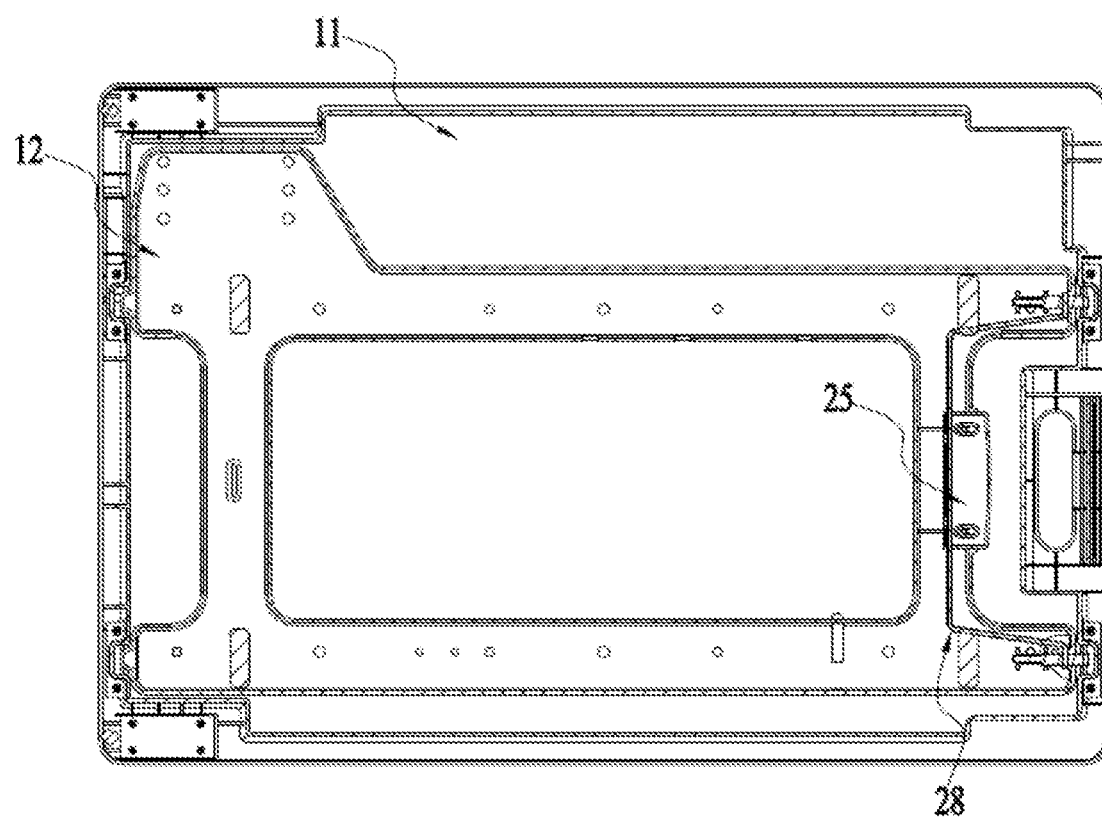
FIG. 22 is a cross-sectional view of the structure shown in FIG. 21 taken along line A-A.
Figure 23:
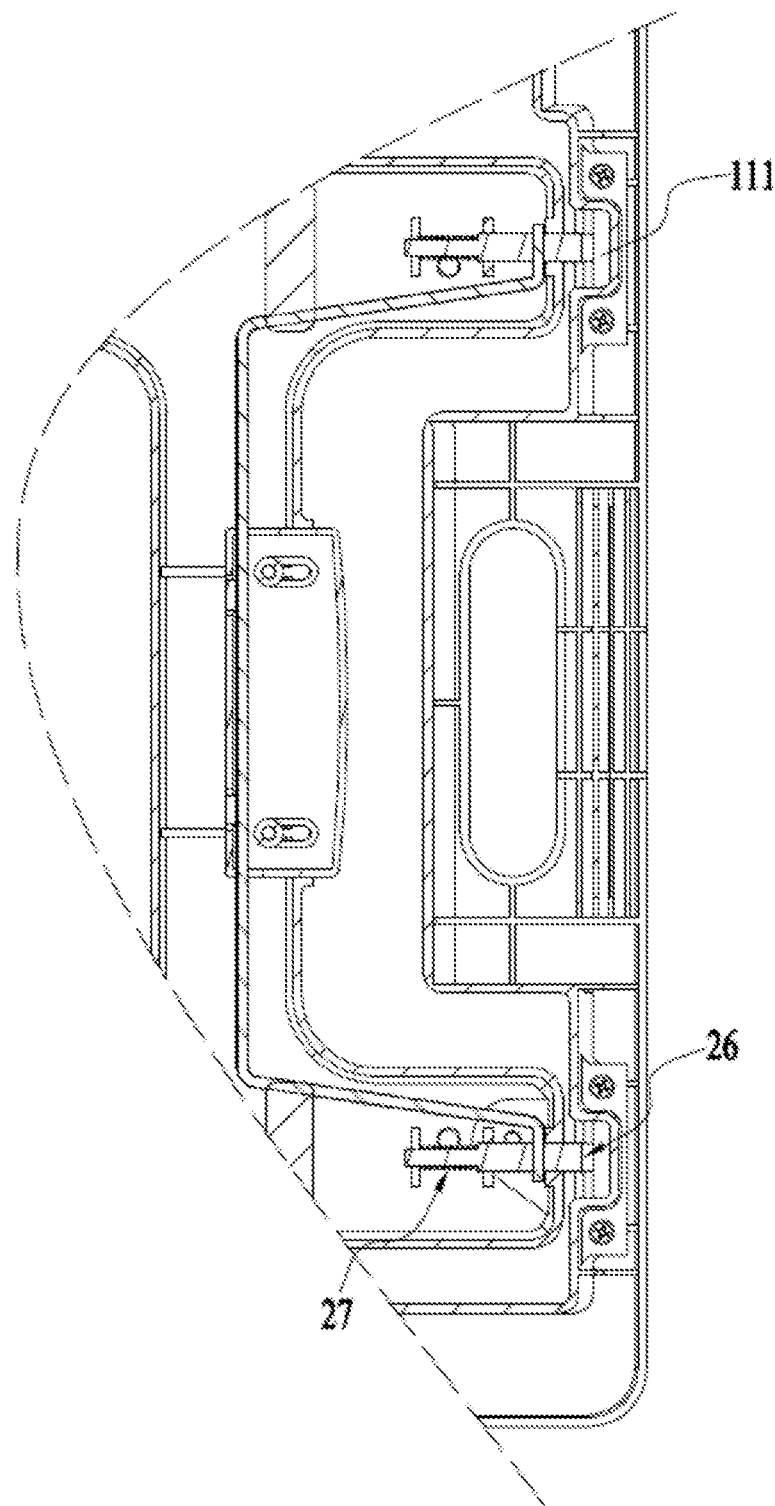
FIG. 23 is an enlarged schematic view of a portion of the structure in FIG. 22.
Figure 24:
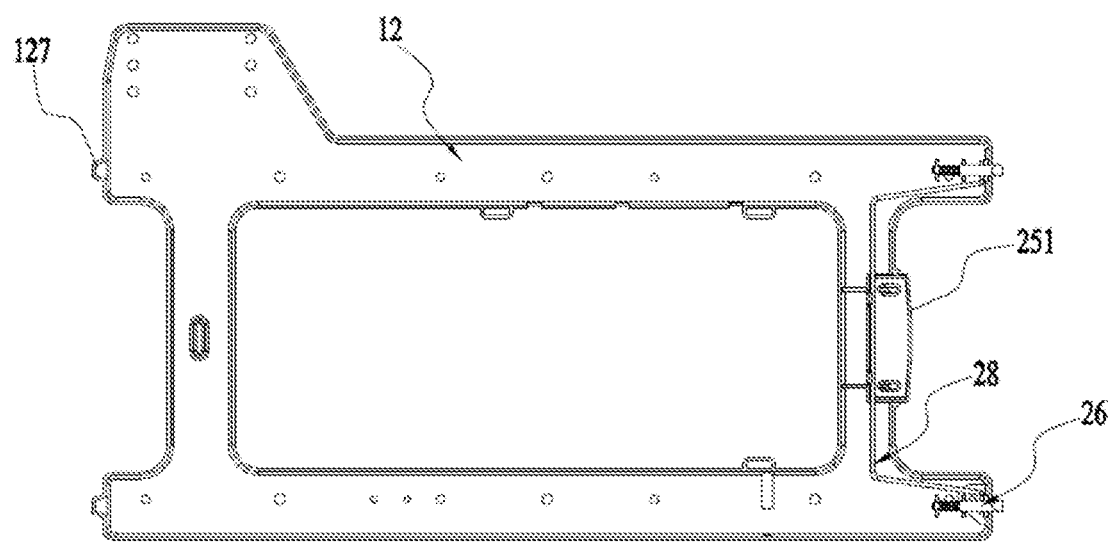
FIG. 24 is a bottom view of the frame in FIG. 1.
Figure 25:
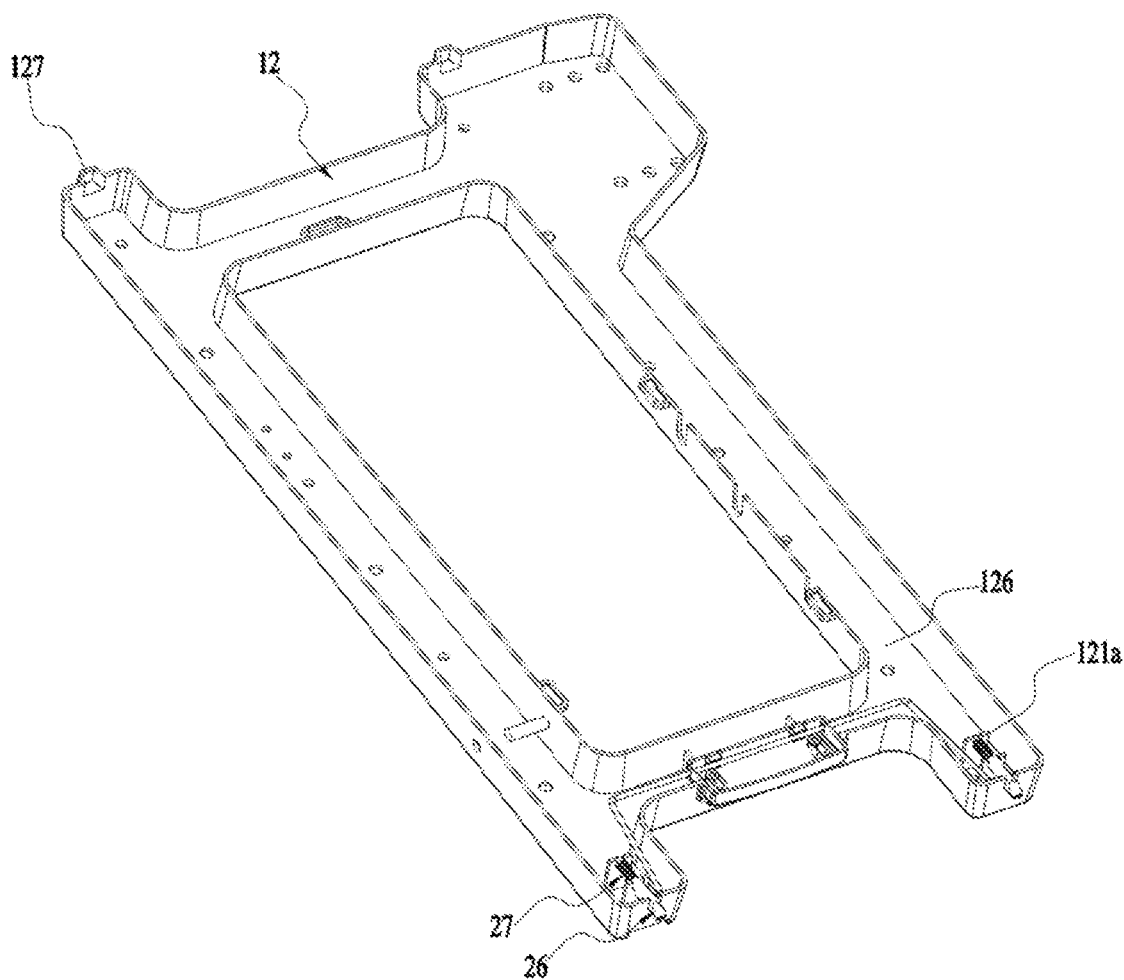
FIG. 25 is a perspective structural view diagram of the structure shown in FIG. 24.
Figure 26:
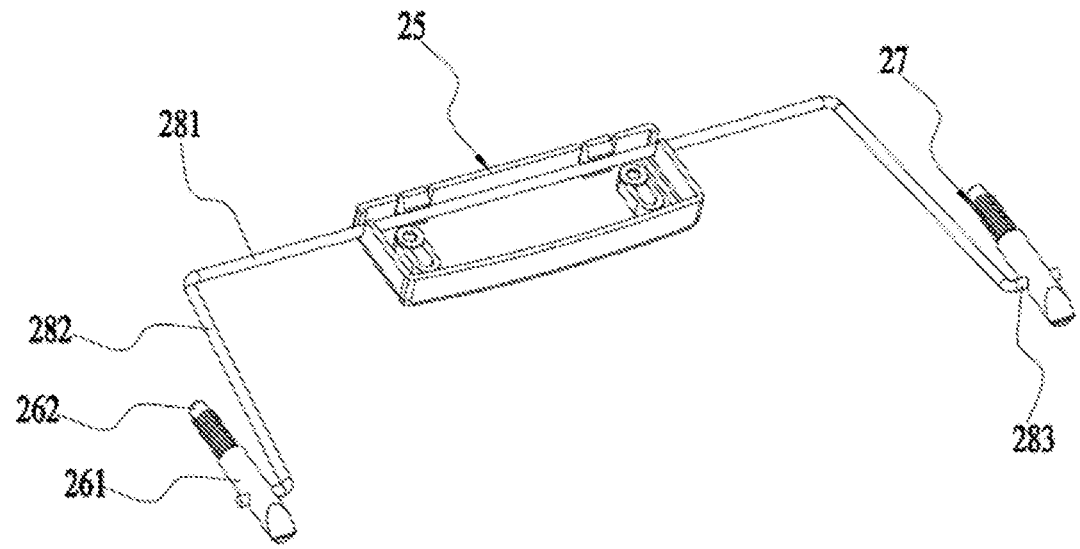
FIG. 26 is a schematic structure diagram of the operating member, the linking member, the biased pressing member and the movable member in FIG. 25.

As illustrated in FIGS. 1 and 16, the cutting tool 100 further includes a supporting assembly 24 disposed on a front side of the working table 13. The supporting assembly 24 is configured to support the object to be cut at a position higher than the working table 13. For example, the supporting assembly 24 may lift the stone 200 placed on the working table 13, and the user lifts the stone 200 without using a hand, thereby facilitating the user's operation and making the cutting effect better.

As illustrated in FIGS. 16 to 19, the working table 13 is further formed with an abutment groove 135, and when the stone 200 is lifted by the supporting assembly 24, an end of the stone 200 away from the supporting assembly 24 abuts against the abutment groove 135, thereby enabling the stone 200 to be stably support.

The supporting assembly 24 includes two supporting legs 241 and a contacting plate 242. The two supporting legs 241 are rotatably connected to the working table 13. The working table 13 is formed with a groove 136, and the two supporting legs 241 are partially embedded in the groove 136. The contacting plate 242 is configured to directly contact the object to be cut, and the contacting plate 242 is disposed between the two support legs 241. The contacting plate 242 is further formed with an curved surface 242a for contacting the surface of the stone 200, which can prevent the supporting assembly 24 from scratching the surface of the stone 200.

As illustrated in the figures, the contacting plate 242 is further formed with a relief groove 242b. When a cutting member 151 is moved upward in a direction perpendicular to the table surface of the working table 13 to the farthest from the working table 13, the lowest point O of the cutting member 151 is also higher than the lowest point P of the relief groove 242b when the contacting plate 242 supports the stone 200. Thus, the cutting member 151 can avoid the stop of the contacting plate 242 when cutting the stone 200.

As illustrated in FIGS. 20 to 26, in order to realize a connection between the frame 12 and the water basin 11, the cutting tool 100 further includes an operating member 25, a movable member 26 and a biased pressing member 27, and the water basin 11 is further formed with a jointing portion 111 cooperating with the movable member 26.

The operating member 25 is configured to be operated by the user. The movable member 26 and the frame 12 constitute a movable connection that can be switched between the first movable position and the second movable position. The biased pressing member 27 is configured to bias the movable member 26 to have a moving trend toward the first movable position. When the user operates the operating member 25, the operating member 25 drives the movable member 26 to overcome the biased pressing of the biased pressing member 27, and the movable member 26 will move toward the second movable position. For the movable member 26, when the movable member 26 is moved to the first movable position under the bias of the biased pressing member 27, the movable member 26 may be engaged with the jointing portion 111 of the water basin 11. The frame 12 forming a connection with the movable member 26 is enabled to couple with the jointing portion 111 of the water basin 11 and form a connection. When the movable member 26 is moved to the second movable position under a condition that the user operates the operating member 25, the movable member 26 is disengaged from the jointing portion 111 of the water basin 11, so that the frame 12 forming a connection with the movable member 26 is disengaged from the water basin 11.

Thus, when it is necessary to mount the frame 12 to the water basin 11, the user may first dispose the frame 12 at a position where the movable member 26 is close to the jointing portion 111 of the water basin 11. At this time, as the operating member 25 is operated by the user the movable member 26 is moved to the second movable position, so that the movable member 26 and the jointing portion 111 are disengaged from each other, and the user only needs to stop the operation on the operating member 25. The movable member 26 is moved to the first movable position under the biasing force of the biased pressing member 27, so that the movable member 26 is combined with the jointing portion 111 of the water basin 11, thereby realizing a connection of the frame 12 and the water basin 11. Similarly, when the frame 12 needs to be disassembled, the user only needs to operate the operating member 25. At this time, the movable member 26 may overcome the biased force of the biased pressing member 27 and be moved to the second movable position, so that the movable member 26 is disengaged from the jointing portion 111 of the water basin 11, thereby realizing the disassembly of the frame 12 and the water basin 11. Therefore, the user can operate the operating member 25 to quickly and easily realize the disassembly and assembly of the frame 12 and the water basin 11, which is convenient for the user's operation and has a simple structure.

The entirety of the pair of transverse beams and the pair of longitudinal beams may further be formed with a receiving groove 126 which is open downward.

The number of the movable member 26 may be two, and the two movable members 26 are respectively disposed on the pair of transverse beams, and the movable member 26 is further disposed at an end portion of the transverse beam 121 at a longitudinal direction thereof. When the two movable members 26 are respectively mounted to the pair of transverse beams 121, the two movable members 26 are further symmetrically disposed with respect to a symmetry plane between them. In the present embodiment, the movable member 26 may be a movable pin mounted to the first transverse beam 121, and the movable pin and the first transverse beam 121 constitute a slidable connection along the longitudinal direction thereof. When the movable pin slides relative to the first transverse beam 121, the movable pin is partially embedded into the receiving groove 126 on the first transverse beam 121, and the other part protrudes out of the first transverse beam 121. The portion of the movable pin that protrudes out of the first transverse beam 121 is a portion capable of cooperating with the water basin 11.

The jointing portion 111 may be a groove formed on the water basin 11, and when the movable member 26 is located in the first position, a portion of the movable member 26 protruding from the frame 12 may be fitted into the groove, and then realizes a combination of the movable member 26 and the jointing portion 111.

The operating member 25 and the frame 12 form a movable connection. In one or more embodiments, the operating member 25 is disposed on the second longitudinal beam 124 and slidably coupled to the second longitudinal beam 124. The operating member 25 is further disposed between the two movable members 26, and the operating member 25 is symmetrical with respect to the symmetry plane of the two movable members 26. When the operating member 25 is disposed on the second longitudinal beam 124, the operating member 25 further includes a contacting portion 251 partially protruding the frame 12. The contacting portion 251 is configured to contact the user's hand. When the user holds the second longitudinal beam 124, the user's hand holding the second longitudinal beam 124 may also be in contact with the contacting portion 251 at the same time. Thus, when the user needs to disassemble the frame 12, as long as the longitudinal beam 122 is gripped while pressing the contacting portion 251. The entire frame 12 is held by holding the second longitudinal beam 124 to remove the frame 12 from the water basin 11, while achieving a disengagement of the frame 12 and the water basin 11. The removal from the water basin 11 enables the disassembly and assembly of the frame 12 and the water basin 11 in one step, which further facilitates the user's operation and is also faster to operate.

The biased pressing member 27 biases the movable member 26, and in particular, the biased pressing member 27 may be a coil spring that sleeved around the movable pin. The movable pin may include a first portion 261 and a second portion 262 in longitudinal direction. The largest dimension of the first portion 261 in a direction perpendicular to longitudinal direction of the first portion is greater than the largest dimension of the second portion 262 in longitudinal direction of the first portion. The coil spring is sleeved around the second portion 262, and the transverse beam 261 of the frame 12 is further formed with a stopping protrusion 121a, so that both ends of the coil spring may respectively abut the stopping protrusion 121a and the first portion 261 of the movable member 26. Thereby the biased pressing member 27 is capable of biasing the movable member 26 to move toward the first movable position along longitudinal direction of the movable member 26.

In addition, the cutting tool 100 further includes a linking member 28 configured to achieve linkage between the operating member 25 and the movable member 26. The linking member 28 includes an active portion and a driven portion. The active portion is connected to the operating member 25, and the driven portion is connected to the movable member 26. Thus, when the user operates the operating member 25, the active portion moves with the operating member 25 relative to the frame 12, and the active portion drives the driven portion to move relative to the frame 12, which in turn drives the movable member 26 to move relative to the frame 12. In one or more embodiments, the linking member 28 is a connecting rod, and the connecting rod includes a first segment 281, a second segment 282 and a third segment 283. The first segment 281 forms the active portion of the linking member 28. The third segment 283 forms the driven portion of the linking member 28. The second segment 282 is connected between the first segment 281 and the third segment 283. The first segment 281 and the third segment 283 are parallel to each other, the first segment 281 may be partially engaged in the operating member 25. The third segment 283 is partially inserted into the slotting hole formed on the movable pin. The second segment 282 is respectively obliquely intersected with the first segment 281 and the third segment 283. For the entire linking member 28, the linking member 28 may also be symmetrical about the symmetry plane of the movable member 26. Correspondingly, the connecting rod may include one first segment 281, two second segments 282 respectively disposed at both ends of the first segment 281, and a third segment 283 respectively connected to the two second segments 282. The first segment 281, the second segment 282 and the third segment 293 of the connecting rod may further form a zigzag structure.

For the frame 12, the operating member 25, the biased pressing member 27 and the movable member 26 enable one end of the frame 12 to be coupled to the water basin 11. It can be understood that the other end of the frame 12 may be provided with the operating member 25, the biased pressing member 27 and the movable member 26 with a same structure. In the present embodiment, in order to facilitate the user's operation, one end of the frame 12 is coupled to the water basin 11 via the above-mentioned operating member 25, biased pressing member 27 and movable member 26. The other end may mate with the water basin 11 via a convex structure 127 and a coupling groove 112 disposed on the water basin 11.

In one or more embodiments, the frame 12 is formed with the above-mentioned convex structure 127, and the convex structure 127 is disposed at the other end of the transverse beam 121 away from the movable member 26. The convex structure 127 may be formed by an extension of the frame 12 by outwardly protruding. The above-mentioned coupling groove 112 is provided at a position of the water basin 11 corresponding to the convex structure 127, so that the convex structure 127 is partially embedded into the coupling groove 112. The coupling groove 112 and the above-mentioned jointing portion 111 may be respectively disposed on the opposite side walls of the water basin 11, and located at the inner side of the side wall.

Figure 27:
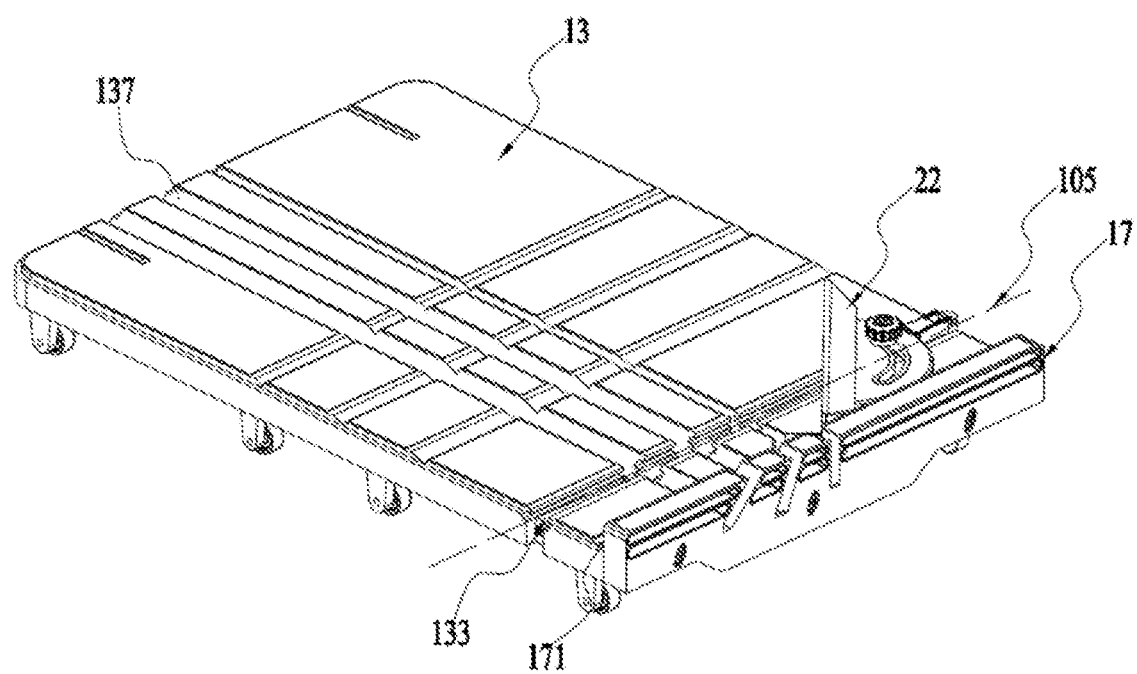
FIG. 27 is a perspective structural view of the working table, the fence and the angle guide assembly in FIG. 1.

Of course, in order to cut the object along a straight line, as shown in FIG. 27, the working table 13 may be formed with a cutting groove 137. An extending direction of the cutting groove 137 is a straight line, and the extending direction of the cutting groove 137 is perpendicular to the first axis 102 rotated around by the cutting member 151.

Of course, in order to cut the object along a straight line, as shown in FIG. 27, the working table 13 may be formed with a cutting groove 137. An extending direction of the cutting groove 137 is a straight line, and the extending direction of the cutting groove 137 is perpendicular to the first axis 102 rotated around by the cutting piece 151.

Figure 28:
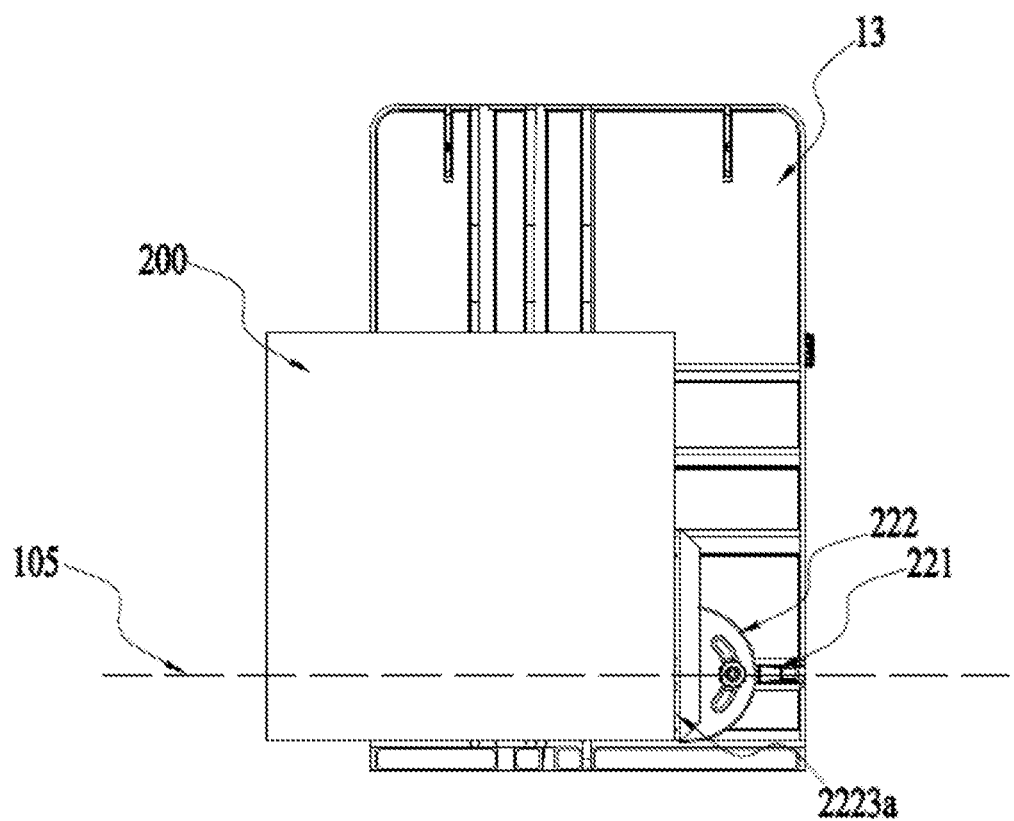
FIG. 28 is a plan view of the structure shown in FIG. 27, wherein the stone placed on the working table is positioned at the 90-degree cutting position.
Figure 29:
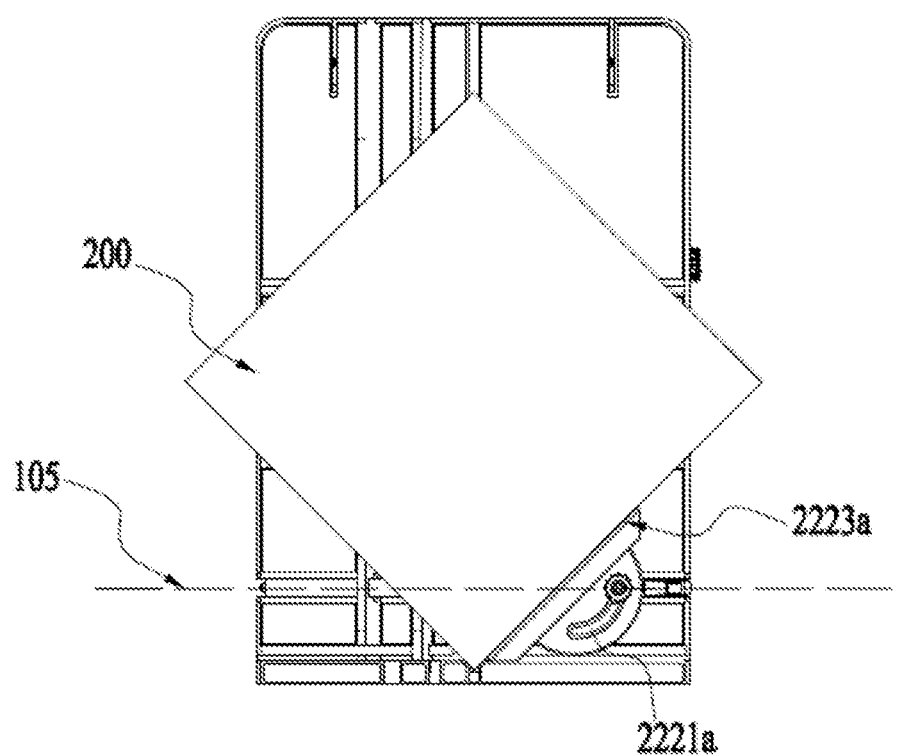
FIG. 29 is a plan view of the structure shown in FIG. 27, wherein the stone placed on the working table is positioned at the 45-degree cutting position.
Figure 30:
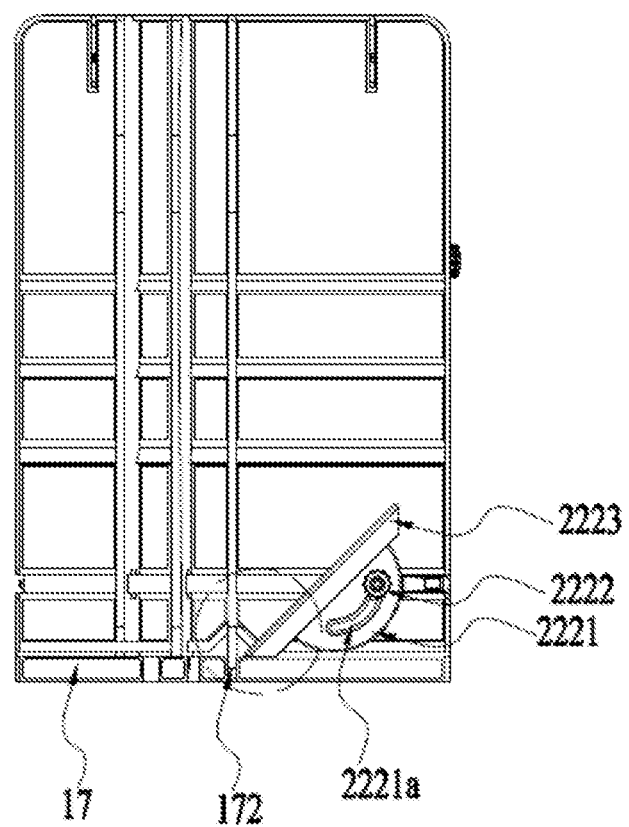
FIG. 30 is a plan view of the structure shown in FIG. 27.
Figure 31:
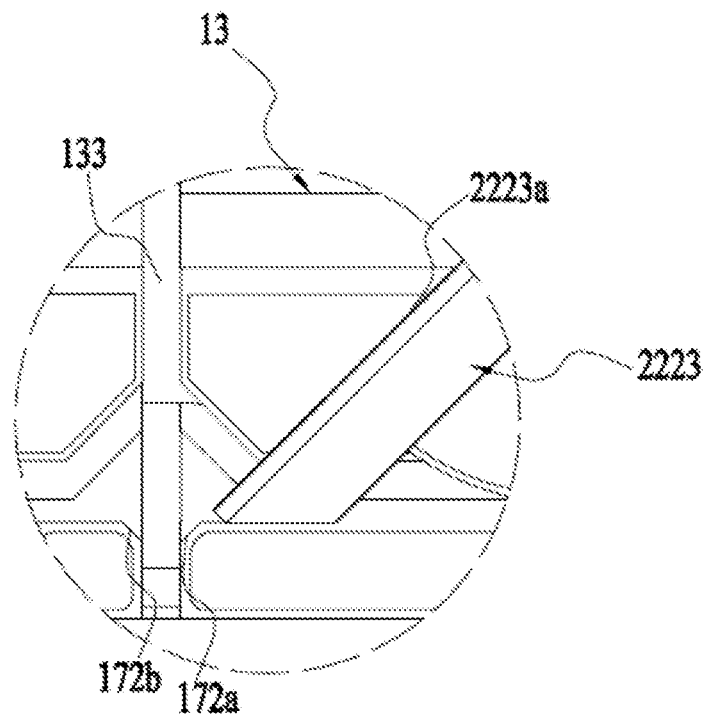
FIG. 31 is an enlarged structural view of a partial region of the structure shown in FIG. 30.
Figure 32:
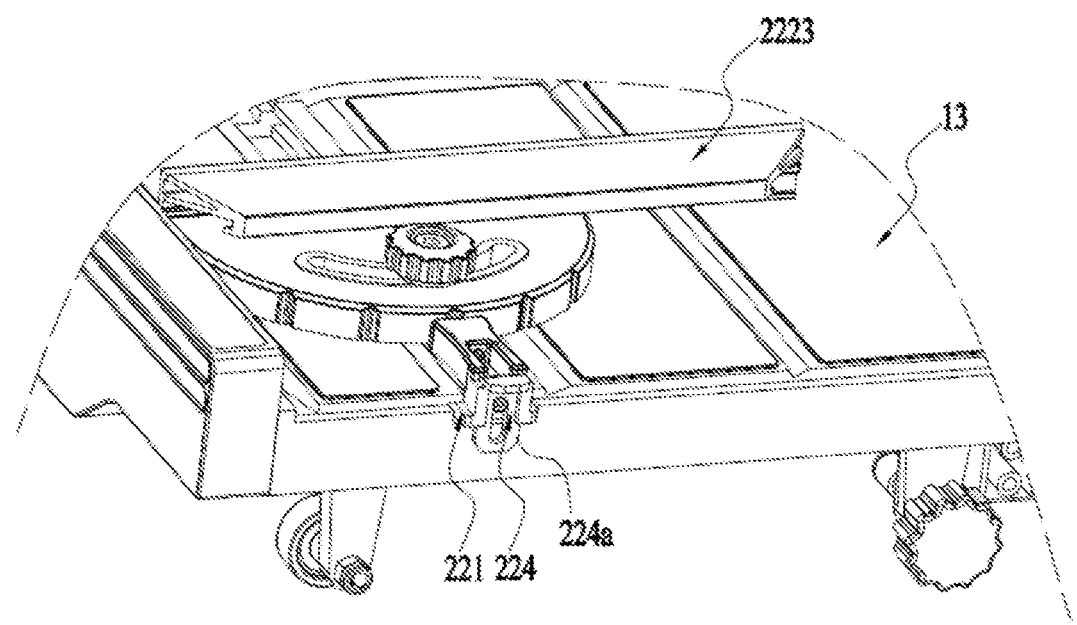
FIG. 32 is an enlarged structural view of a part of the structure of the working table, the fence and the angle guide assembly in FIG. 1.
Figure 33:
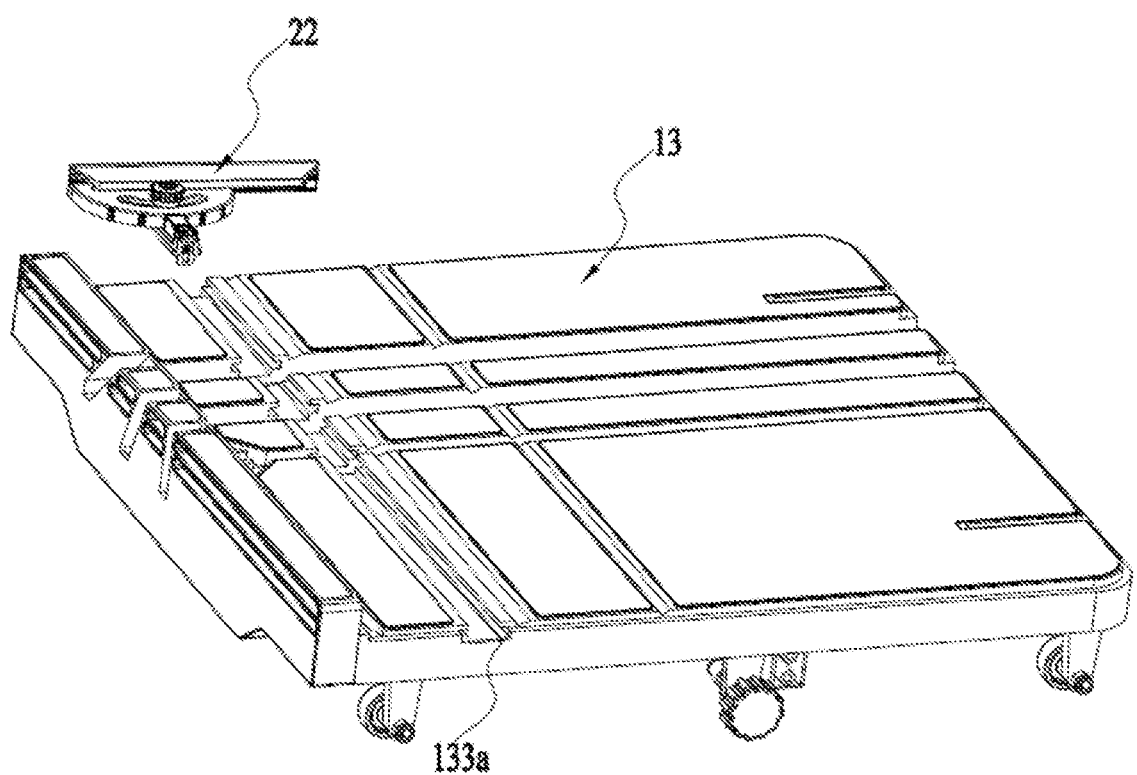
FIG. 33 is a schematic structure diagram shown in FIG. 27 when the angle guide assembly is disengaged from the working table.
Figure 34:
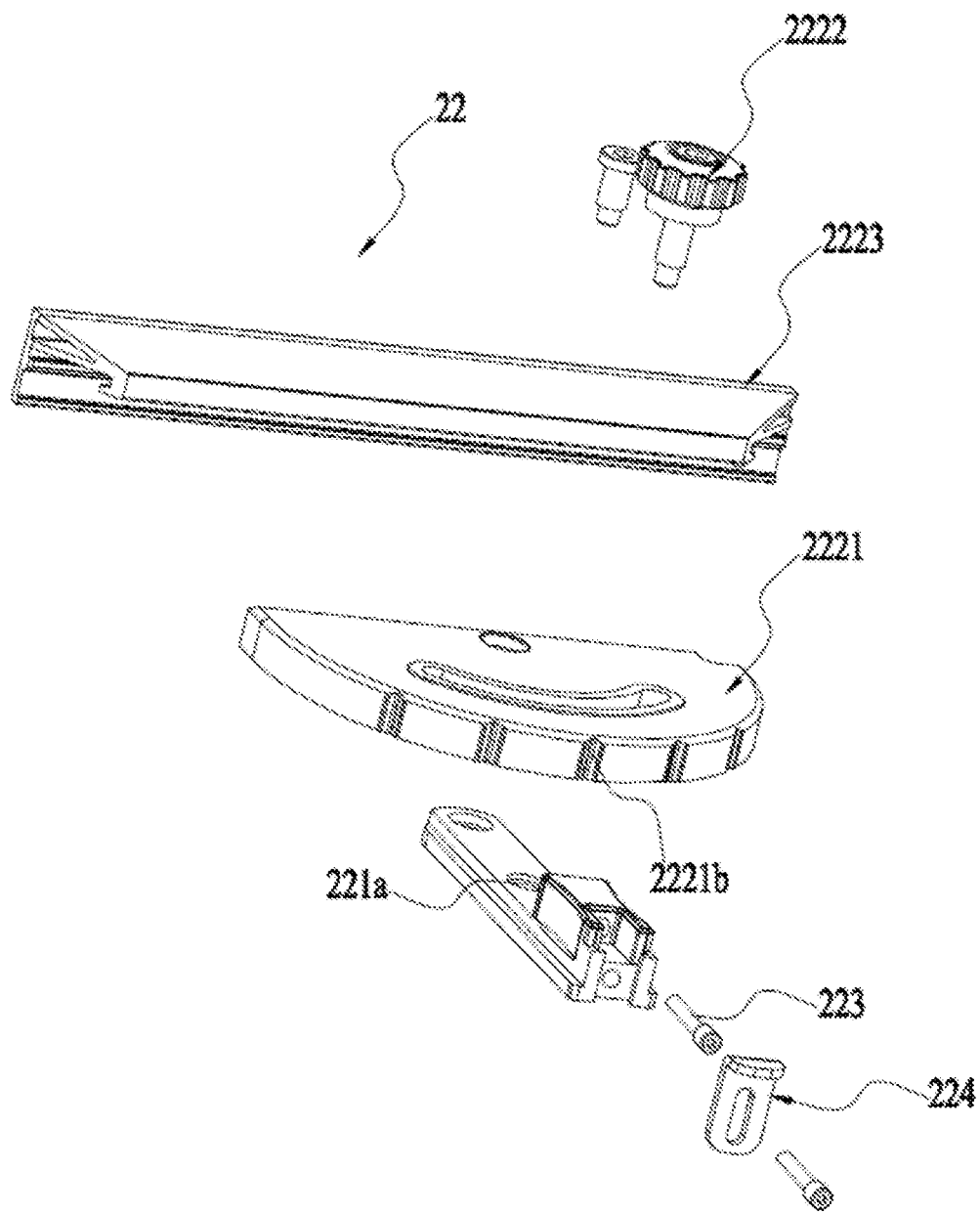
FIG. 34 is an explosion view of the angle guide assembly in FIG. 27.

Through the arrangement of the angle guide assembly 22, the cutting tool 100 can realize the 90-degree cutting of the stone 200 shown in FIG. 28, and can also realize the 45-degree cutting of the stone 200 shown in FIG. 29.

The main chute 133 extends along the second straight line 105, which is also perpendicular to the first straight line 101. The angle guide assembly 22 is slidable to different positions of the working table 13 as it slides along the main chute 133.

As illustrated in FIGS. 27 to 34, the angle guide assembly 22 includes the slider 221 described above and an angle guide body 222. The angle guide body 222 includes a guide disc 2221, a guide pin 2222 and a guide rule 2223. The guide disc 2221 and the guide pin 2222 cooperate to form a slidable connection. The guide rule 2223 is disposed on one side of the fence surface 171 close to the cutting head 15, and the guide rule 2223 is further configured to contact one side of the object.

The guide disc 2221 is formed with a guiding rail 2221a. The guide pin 2222 and the guide disc 2221 constitute a slidable connection that slides along the guiding path of the guiding rail 2221a. The guide rule 2223 is connected to the guide disc 2221. Thus, when the guide pin 2222 is fixed, the user operates the guide disc 2221 with respect to the guide pin 2222, so that the guide disc 2221 slides along the guiding path of the guiding rail 2221a respect to the guide pin 2222. When the guide disc 2221 slides, the guide rule 2223 also slides with the guide disc 2221. The guide rule 2223 is further formed with an abutment surface 2223a, and the abutment surface 2223a is perpendicular to the working plane of the working table 13, which enables the abutment surface 2223a to be in contact with a side of the object placed on the working table 13, thereby positioning the cutting angle of the object. As shown in FIG. 28, when the guide disc 2221 slides to a position enabling the guide pin 2222 to be located in a first position of the guiding rail 2221a the abutment surface 2223a is perpendicular to the first straight line 101. As shown in FIG. 29, when the guide disc 2221 slides to a position enabling the guide pin 2222 to be located in a second position of the guiding rail 2221a the abutment surface 2223a obliquely intersects the first straight line 101. Thus, by sliding the guide disc 2221 relative to the guide pin 2222, at least two different abutment modes can be achieved by the guide rule 2223, so that at least two different cutting angles of the object can be achieved.

In order to realize the sliding of the angle guide assembly 22 along the second straight line 105, the working table 13 is formed with the above-mentioned main chute 133 extending along the second straight line 105. The angle guide assembly 22 includes the above-mentioned slider 221. The slider 221 and the working table 13 constitute a slidable connection that can slide in a direction the main chute 133 extends. The direction of the second straight line 105 is also perpendicular to an extending direction of the cutting groove 137. In this way, when the guide disc 2221 slides to the position enabling the guide pin 2222 to be located at the first position of the guiding rail 2221a is perpendicular to the second straight line 105, the abutment surface 2223a is perpendicular to the second straight line 105. The second straight line 105 is perpendicular to the extending direction of the cutting groove 137, so that the abutment surface 2223a can be parallel to the extending direction of the cutting groove 137. At this time, a positioning of a 90-degree cutting for the object abutting against the abutment surface 2223a can be achieved. Similarly, when the guide disc 2221 slides to a position enabling the guide pin 2222 to be located in a second position of the guiding rail 2221a, the abutment surface 2223a obliquely intersects the second straight line 105. The second straight line 105 is perpendicular to the extending direction of the cutting groove 137, so that abutment surface 2223a can obliquely intersect with the extending direction of the cutting groove 137. At this time, a positioning of cutting angle greater than 0 degree and less than 90-degree for the object abutting against abutment surface 2223a can be quickly realized.

In one or more embodiments, the guide disc 2221 has an arch, and further, may be a semicircular arch. The guide rule 2223 is disposed at a chord of the arch corresponding to the guide disc 2221. The guiding rail 2221a is formed on a disc surface of the guide disc 2221. The guiding rail 2221a may not pass through the guide disc 2221 in a direction perpendicular to the disc surface of the guide disc 2221. At this time, the corresponding guiding rail 2221a is a groove having a groove bottom. Or the guiding rail 2221a may pass through the guide disc 2221. At this time, the corresponding guiding rail 2221a is a hole that passes through the guide disc 2221. In the present embodiment, take the case that the guiding rail 2221a passes through the guide disc 2221 as an example, and the guide pin 2222 may partially pass through the guiding rail 2221a.

For the guiding rail 2221a, a guiding path of the guiding rail 2221a extends along an arc. Thus, when the guide disc 2221 slides along the guiding path respect to the guide pin 2222, the guide disc 2221 is rotated about an axis passing through the center of the arc. That is to say, a cooperation of the guiding rail 2221a and the guide pin 2222 enables the guide disc 2221 to rotate about an axis. Further, the axis of rotation of the guide disc 2221 is perpendicular to the working plane of the working table 13, so that the guide rule 2223 rotates with the guide disc 2221.

The arc corresponding to the guiding path of the guiding rail 2221a is further symmetrical about a plane perpendicular to the abutment surface 2223a. So that when the guide disc 2221 slides to a position enabling the guide pin 2222 to be located at the middle of the guiding rail 2221a, that is, corresponding to the case that the guide pin 2222 is located at the first position inside the guiding rail 2221a. At this time, a positioning of a 90-degree cutting for the object can be achieved. Further, the angle of the arc corresponding to the guiding path of the guiding rail 2221a is 90-degree. When the guide disc 2221 slides enabling the guide pin 2222 to be located at both ends of the guiding rail 2221a, abutment surface 2223a has been rotated by 45-degree respective to the position of abutment surface 2223a when the guide pin 2222 locates at the first position. At this time, the abutment surface 2223a can be at an angle of 45-degree with the extending direction of the second straight line 105 or the cutting groove 137, and thereby a positioning of a degree cutting for the object placed on the working table 13 can be achieved.

In order to achieve rapid positioning, the angle guide assembly 22 further includes a positioning pin 223. The guide disc 2221 is formed with a positioning groove 2221b. When the guide disc 2221 slides to a position that the positioning groove 2221b is aligned with the positioning pin 223, the positioning pin 223 is partially embedded into the positioning groove 2221b, so that the position of the guide disc 2221 can be temporarily fixed. In one or more embodiments, for the arcuate guide disc 2221, the positioning groove 2221 may be disposed at the edge of the guide disc 2221, and further disposed at the arc of the arch. Thus, by the reasonable arrangement of the position of the positioning groove 212, the guide disc 2221 can be positioned at a position where the degree cutting, the degree cutting, and the like of the object can be quickly achieved.

The guide pin 2222 is further configured to mount the guide disc 2221 to the slider 221. In one or more embodiments, the slider 221 is formed with a mounting hole 221a. The guide pin 2222 passes through the guiding rail 2221a of the guide disc 2221 and extends into the mounting hole 221a. When the guide disc 2221 slides to a preset position, the user only needs to tighten the guide pin 2222 to enable the position of the guide disc 2221 relative to the slider 221 to be fixed.

As described above, the guide rule 2223 is mounted on the guide disc 2221. In one or more embodiments, the guide rule 2223 is mounted on the chord of the arcuate guide disc 2221. When the guide rule 2223 is mounted to the guide disc 2221, the abutment surface 2223a of the guide rule 2223 is parallel to the chord of the guide disc 2221. Further, the guide rule 2223 forms a slidable connection with the guide disc 2221 in an extending direction of the abutment surface 231, that is, the guide rule 2223 can slide in an extending direction of the chord, so that the position of the guide rule 2223 can be adjusted.

The slider 221 is disposed inside the main chute 133. The main chute 133 may include a pair of guiding grooves 133a respectively recessed inwardly parallel to the working plane of the working table 13, the notches of the two guiding grooves 133a are oppositely disposed. Both sides of the slider 221 are respectively embedded into the pair of guiding grooves 132a. Thus, when the slider 221 slides along the main chute 133, the angle guide assembly 22 can be fixed in a direction perpendicular to the working table 13.

In order to fix the position of the angle guide assembly 22 in the direction of the second straight line 105, the angle guide assembly 22 further includes an insert 224. The insert 224 forms a slidable connection with the slider 221 in a direction perpendicular to the working table 13. The direction perpendicular to the working table 13 as described herein is the direction perpendicular to the working plane of the working table 13 as described above. The insert 224 further includes a protruding portion 224a. When the slider 221 slides to the edge of the working table 1 along the second straight line 105, the insert 224 slides to a position enabling the protruding portion 224a to protrude and be in contact with a side of the working table 13. Thus, when the protruding portion 224a is located on a side of the working table 13 and is in contact with the side, the position of the angle guide assembly 22 along the second straight line 105 can be fixed, so that the angle guide assembly 22 can be fixed at the edge of the working table 13.

For the stone 200 with a rectangular shape, when the stone 200 is cut at 45-degree, the corners of the stone 200 are difficult to be positioned. For this reason, the fence 17 is further formed with a notch 172 that is aligned with the cutting groove 137. A first auxiliary surface 172a and a second auxiliary surface 172b are formed at the notch 172. The first auxiliary surface 172a may be parallel or coincident with the abutment surface 2223a, and the second auxiliary surface 172b may be perpendicular to the first auxiliary surface 172a. When the stone 200 is placed on the working table 13, the corners of the stone 200 can be placed in the notch 172, and both sides forming the corners of the stone 200 can be respectively associated with the first auxiliary surface 172a and the second auxiliary surface 172b. One of the two sides in contact with the first auxiliary surface 172a is further in contact with the abutment surface 2223a, so that the stone 200 can be stably supported on the working table 13. Further, the first auxiliary surface 172a and the extending direction of the cutting groove 137 form an angle of 45-degree, so that the stone 200 requiring 45-degree cutting can be supported.

Figure 35:
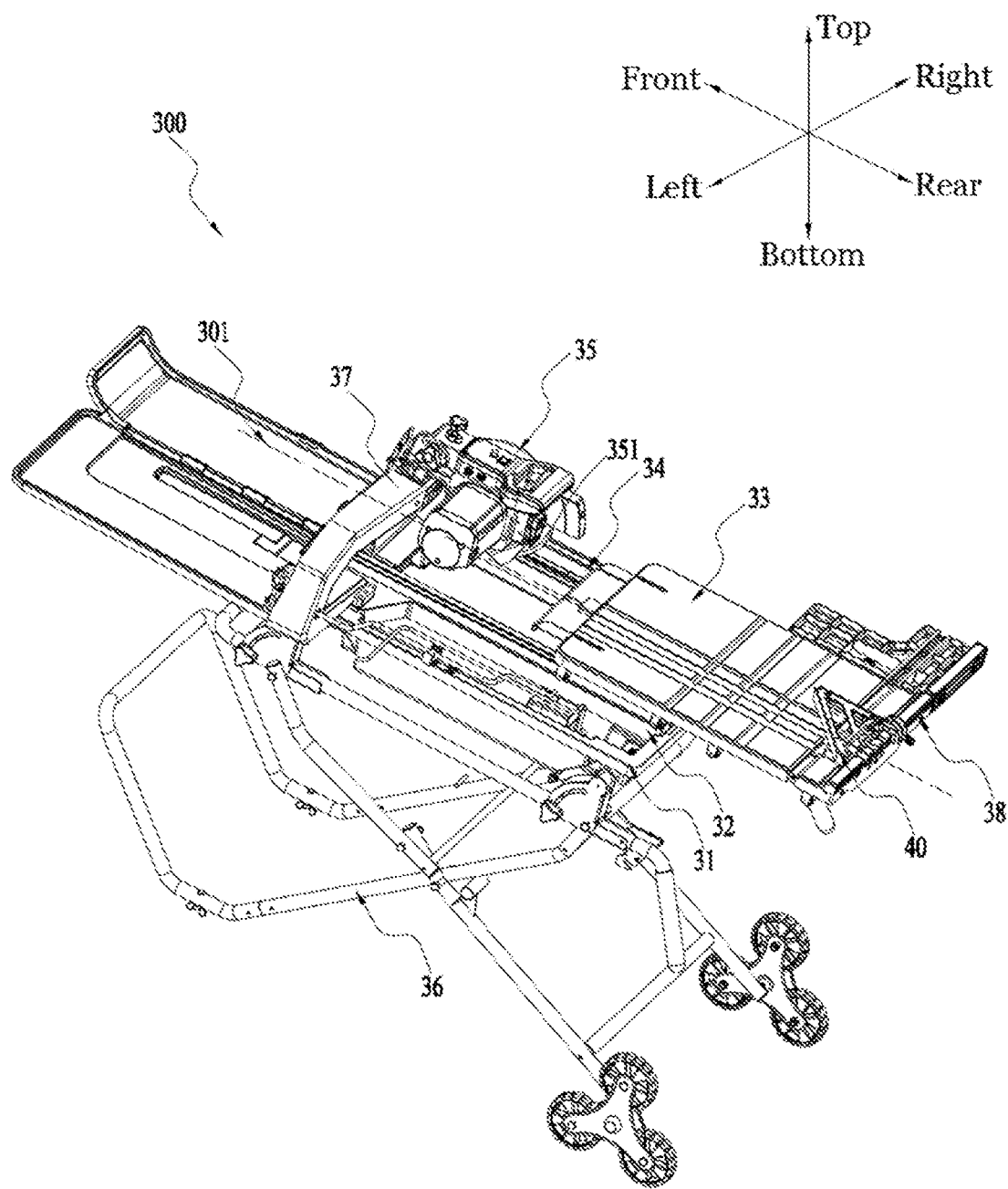
FIG. 35 is a perspective structural view of a cutting tool according to the second embodiment of the present disclosure.

As illustrated in FIG. 35, the cutting tool 300 according to a second embodiment includes a water basin 31, a frame 32, a working table 33, a guiding rail assembly 34, a cutting head 35 and a bracket 36. In order to facilitate the clear description of the technical solution, as shown in FIG. 35, the present disclosure further defines a top side, a bottom side, a front side, a rear side, a left side, and a right side direction of the cutting tool 300.

The water basin 31 is configured to store water for cooling the cutting head 35. During the cutting process, the water stored in the water basin 31 dissipates the cutting head 35 in time; and the water basin 31 receives water splashed from the cutting head 35, thereby avoiding soiling the ground and ensuring cleanness sanitation. In addition, the water basin 31 is also capable of receiving waste generated during the cutting process.

The frame 32 is configure to support the cutting head 35, and the frame 32 is mounted on the water basin 31. In order to support the cutting head 35, the cutting tool 300 further includes a supporting arm 18 for directly supporting the cutting head 35, and both ends of the supporting arm 18 are respectively connected to the frame 32 and the cutting head 35, such that the cutting head 35 is supported on the frame 32.

the working table 33 is configured to place an object to be cut, and the working table 33 is further coupled to the frame 32. In one or more embodiments, the working table 33 is slidably mounted to the guiding rail assembly 34 along a first straight line 301, and the guiding rail assembly 34 is mounted to the frame 12. The arrangement described above causes the working table 33 to form a slidable connection with the frame 32 along the first straight line 301. Thereby, the working table 33 may be moved toward the cutting head 35 along the first straight line 301 with respect to the entirety of the cutting head 35, the frame 32, and the guiding rail assembly 34, thereby facilitating the movement of the object toward the cutting head 35, thereby facilitating the cutting operation of the user.

The cutting head 35 is configured to implement a cutting function, and the cutting head 35 is mounted to the frame 32. The cutting head 35 includes a cutting member 351 configured to cut an object. The cutting member 351 is rotatable about an axis passing through the cutting member 351. For the tile saw, the cutting member 351 may be a circular saw blade capable of cutting tiles, marble, and the like.

The bracket 36 is configured to support the water basin 31 so that the cutting tool 300 is stably placed on the ground.

Figure 36:
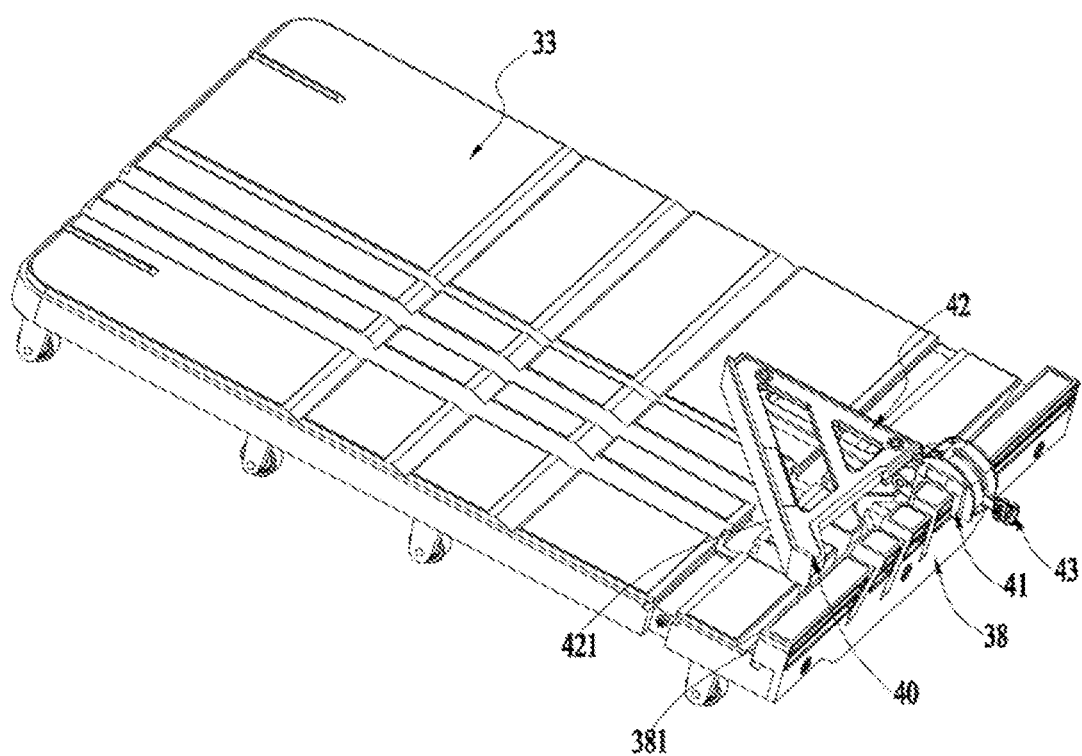
FIG. 36 is a schematic structure diagram of the working table, the fence and the angle guide assembly in FIG. 35.

As illustrated in FIGS. 35 and 36, the cutting tool 100 further includes a fence 38 and an angle guide assembly 40, and both of the fence 38 and the angle guide assembly 40 are mounted on the working table 33.

The fence 38 is disposed at an edge of the working table 33 away from the cutting head 35, and the fence 38 is formed with a fence surface 381 which is perpendicular to the working table 33 and slides along the first straight line 301. The fence surface 381 is configured to abut the object placed on the working table 33. Thus, when the object placed on the working table 33 moves toward the cutting head 35 with the working table 33 and is cut by the cutting member 351, the fence surface 381 can stop the object from moving in a direction away from the cutting head 35.

Figure 37:
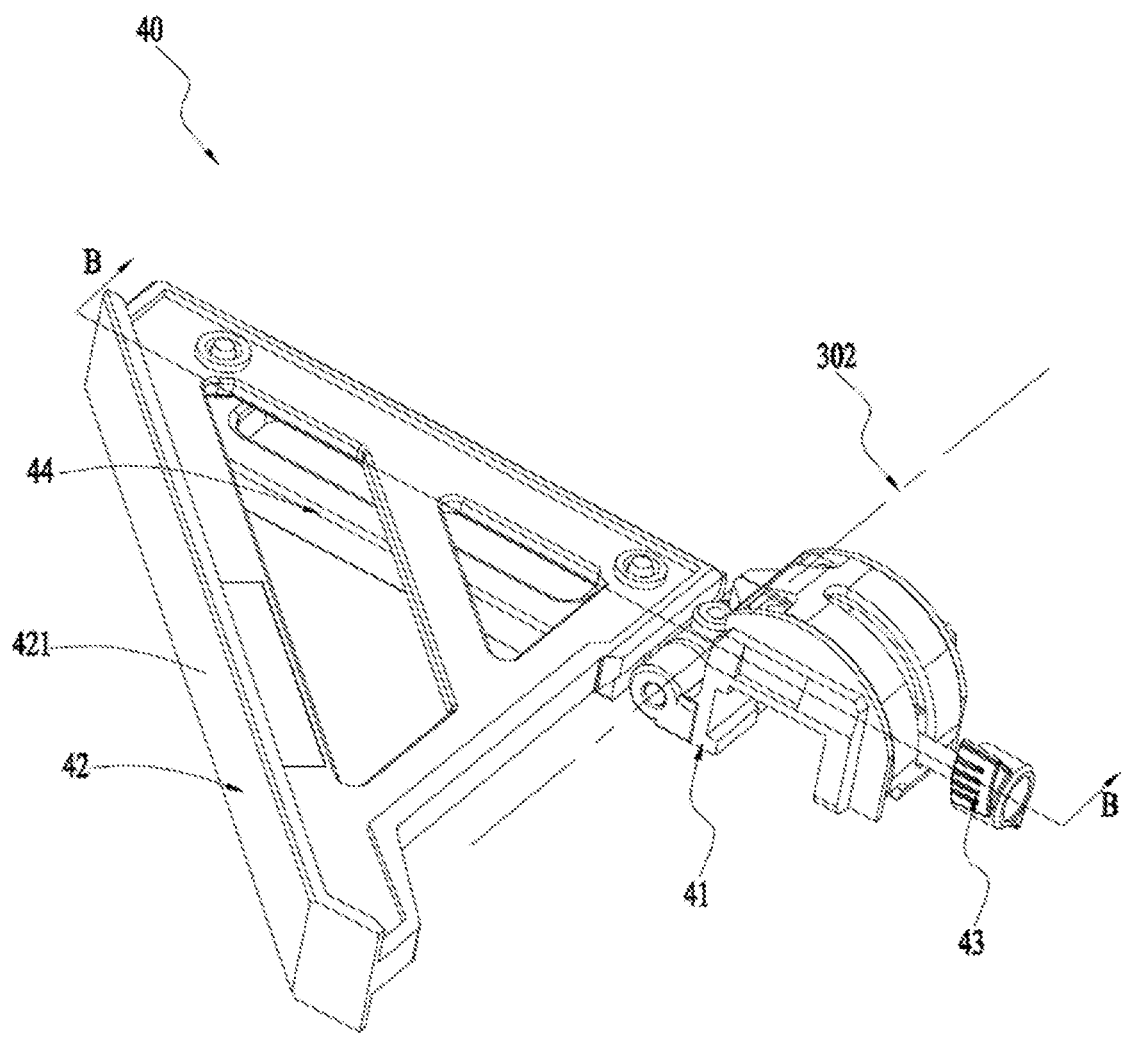
FIG. 37 is a schematic structure diagram of the angle guide assembly in FIG. 35.

As illustrated in FIG. 36 and FIG. 37, the angle guide assembly 40 includes a connecting block 41, an angle guide body 42 and a locking member 43. The connecting block 41 is configured to detachably mount the angle guide assembly 40 to the working table 33. The angle guide body 42 is configured to be in contact with the object placed on the table surface of the working table 33. The locking member 43 is configured to lock a relative position of the angle guide assembly 40 and the working table 33.

As illustrated in FIG. 36, the connecting block 41 is coupled to the fence 38, and the fence 38 is further mounted on the working table 33, so that the angle guide assembly 40 is mounted on the working table 33.

The angle guide body 42 is formed with a guiding plane 421 which is obliquely intersected with the first straight line 301 and slides with the working table 33. A plane in which the guiding plane 421 is located obliquely intersects a plane in which the fence surface 381 is located. When the object is placed on the working table 33, the abutment of the side of the object to the guiding plane 421 can achieve different cutting angles of the object. For example, when the angle between the guiding plane 421 and the first straight line the working table 33 sliding along is 45-degree, the angle guide assembly 40 can quickly realize a positioning of 45-degree for cutting the object.

Figure 38:
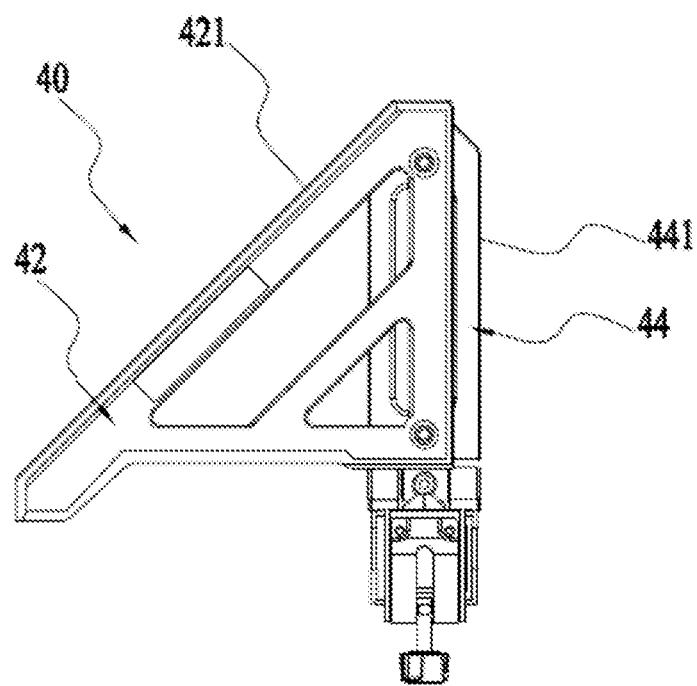
FIG. 38 is a plan view of the structure shown in FIG. 37 when the angle guide body is in the first mounting state.

The angle guide assembly 40 further includes a mounting member 44 configured to mount the angle guide body 42. The mounting member 44 is connected to the connecting block 41. The angle guide body 42 forms a detachable connection with the mounting member 44, and the detachable connection has at least two mounting states shown in FIGS. 38 and 39 relative to the mounting member 44. When the angle guide body 42 is in a first mounting state relative to the mounting member 44 shown in FIG. 38, the guiding plane 421 formed by the angle guide body 42 is located on a left side of the mounting member 44. When the angle guide body 42 is in a second mounting state relative to the mounting member 44 shown in FIG. 39, the guiding plane 421 formed by the angle guide body 42 is located on a right side of the mounting member 44. Thus, the angle guide body 42 can be selectively in the first mounting state or the second mounting state relative to the mounting member 44 to accommodate different cutting needs.

Figure 39:
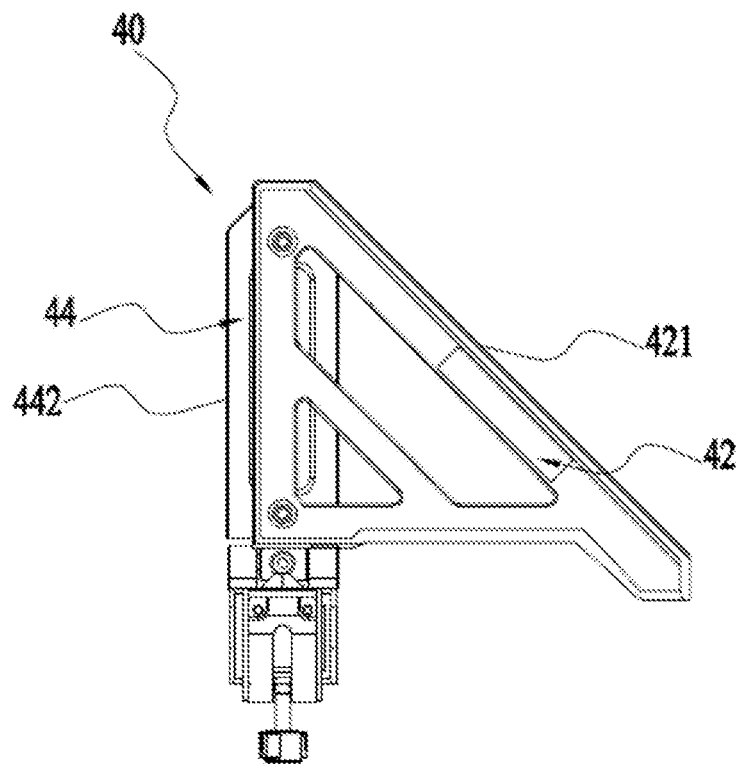
FIG. 39 is a plan view of the structure shown in FIG. 37 when the angle guide body is in the second mounting state.

In addition, the mounting member 44 is further formed with a pair of abutting faces 441, 442 which are parallel to each other. The pair of abutting faces 441, 442 are also perpendicular to the fence surface 381. When the pair of abutting faces 441, 442 are in contact with the sides of the object, a rapid positioning of 90 degree cutting for the object can be achieved. The guide plane 421 formed by the angle guide body 42 is located on the left side of the mounting member 44, the guiding plane 421 is configured to achieve the positioning of 45-degree cutting for the object. The abutment surface 441 is configured to achieve the positioning of 90-degree cutting for the object on the right side of the angle guide body 42. As shown in FIG. 39, when the guiding plane 421 formed by the angle guide body 42 is located at the right side of the mounting member 44, the guiding plane 421 is configured to achieve the positioning of 45-degree cutting for the object on the right side of the angle guide body 42. The abutting face 442 is configured to achieve the positioning of 90 degree cutting for the object on the left side of the angle guide body 42.

The connecting block 41 detachably mounts the angle guide assembly 40 to any one of the working table 33 and the fence 38. The connecting block 41 and the angle guide body 42 constitute a rotatable connection, and the axis 302 of a relative rotation of the connecting block 41 and the angle guide body 42 is perpendicular to the first straight line slided along by the working table 33 in FIG. 35 relative to the frame 12. In one or more embodiments, the angle guide body 42 is mounted to the mounting member 44, and the mounting member 44 is rotatably connected to the connecting block 41. In this way, a rotatable connection is formed by an entirety of the angle guide body 42 and the mounting member 44 and the connecting block 41. When the connecting block 41 is rotated with respect to the entirety of the angle guide body 42 and the mounting member 44, the connecting block 41 is rotated at least to the first mounting position shown in FIG. 40 and the second mounting position shown in FIG. 41. When the connecting block 41 is rotated to the first mounting position, the connecting block 41 is further configured to cooperate with a top of the fence 38. At this time, a relative position between the connecting block 41 and the top of the fence 38 is locked via the locking member 43. When the working table 33 is not provided with the fence 38, the connecting block 41 can be rotated to the second mounting position, and the connecting block 41 is further configured to cooperate with the edge of the working table 33. At this time, a relative position between the connecting block 41 and the edge of the working table 33 is locked via the locking member 43. In this way, the connecting block 41 has at least two different mounting positions respectively mating with the top of the fence 38 and the edge of the working table 33. Whether the fence 38 is provided with on the working table 33 or not, the angle guide assembly 40 can be detachably mounted to the working table 33, thereby increasing the application range of the angle guide assembly 40.

Figure 41:
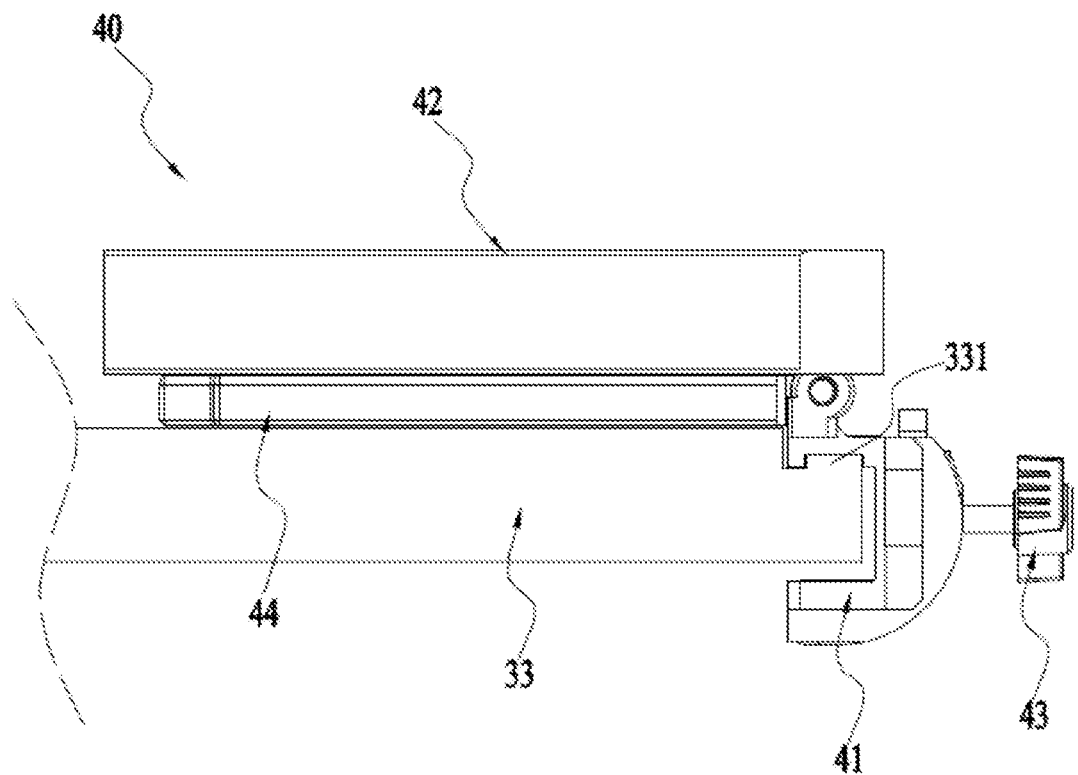
FIG. 41 is a side view of the angle guide assembly and working table in FIG. 35 when the connecting block is in the second mounting position.
Figure 42:
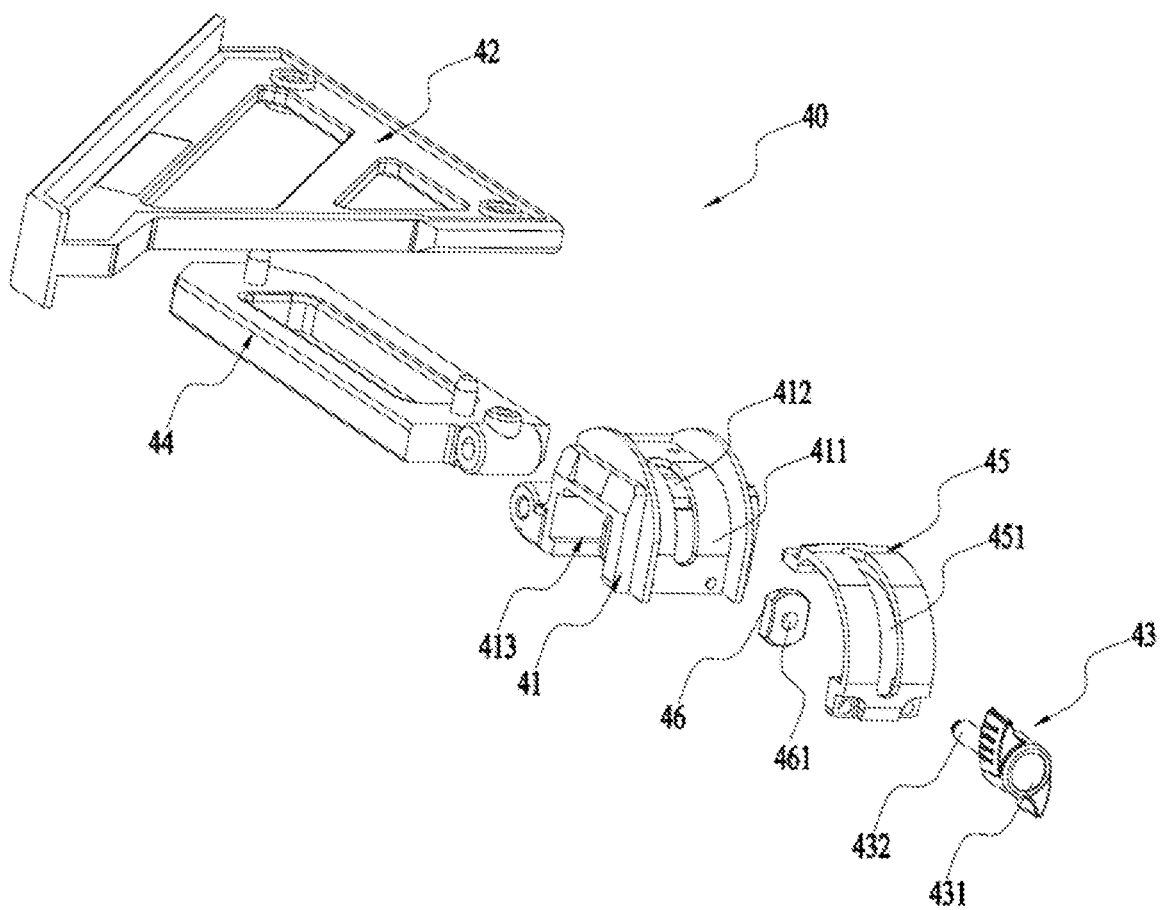
FIG. 42 is an explosion view of the structure shown in FIG. 37.
Figure 43:
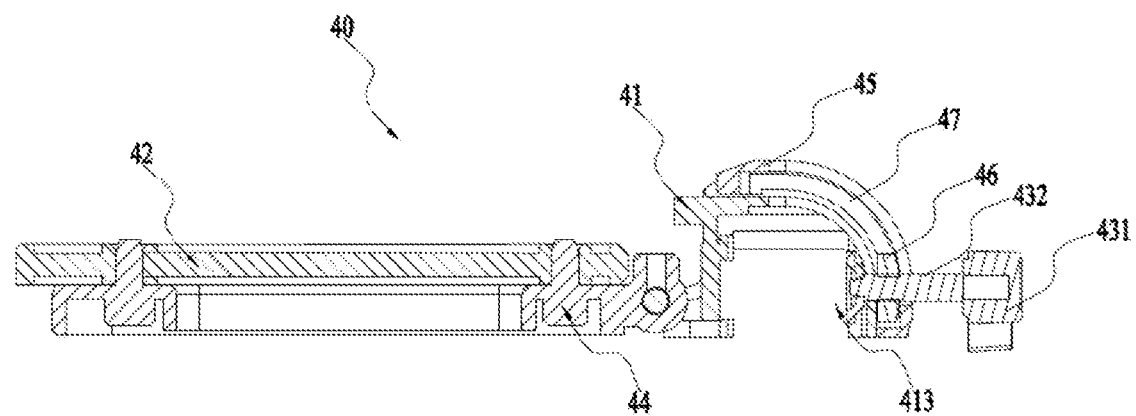
FIG. 43 is a cross-sectional view of the structure shown in FIG. 37 taken along line B-B.

As illustrated in FIGS. 42 and 43, the connecting block 41 is provided with an curved surface 411, and the curved surface 411 is formed with a guiding groove 412. A slot 413 is formed inside the curved surface 411. The guiding groove 412 communicates the inside and the outside of the connecting block 41, and the guiding groove 412 extends in a bending direction of the curved surface 411. The locking member 43 includes an operating portion 431 and a locking lever 432. The operation portion 431 is for the user to operate the locking member 43, and the operating portion 431 is disposed outside the connecting block 41. The locking lever 432 passes through the guiding groove 412 on the curved surface 411 and partially inserts into the slot 413 formed inside the connecting block 41. The connecting block 41 is locked to top of the fence 38 or the edge of the working table 33 via a cooperation of the locking lever 432 and the slot 413. Since the guiding groove 412 extends in the bending direction of the curved surface 411, when the locking lever 432 inserts into the slot 413 through the guiding groove 412 and moves along the extending direction of the guiding groove 412, the locking member 43 constitutes a rotatable connection with the connecting block 41. An axis of the locking member 43 that rotates relative to the connecting block 41 along the extending direction of the guiding groove 412 is a center line of the curved surface 411. Thus, when the connecting block 41 is rotated to the first mounting position in FIG. 40 and the second mounting position in FIG. 41, the locking member 43 can make a corresponding positional change to lock the position of the connecting block 41.

The angle guide assembly 40 may also include a guide frame 45 and an insert 46. The guide frame 45 is disposed outside the connecting block 41, and the insert 46 is disposed between the guide frame 45 and the connecting block 41.

The guide frame 45 is mounted at the outer side surface of the curved surface 411, and the guide frame 45 is further provided with a passing groove 451 through which the locking lever 432 pass corresponding to the position of the guiding groove 412. A gap 47 is further formed between the guide frame 45 and the outer side surface of the curved surface 411. The gap 47 extends along the bending direction of the curved surface 411. The insert 46 is disposed in the gap 47, and the insert 46 is possible to slide in the gap 47 along the bending direction of the curved surface 411. The insert 46 is further formed with a threaded hole 461, the threaded hole 461 is located opposite to the position of the guiding groove 412. The threaded hole 461 formed by the insert 46 is passed through by the locking lever 432 of the locking member 43, and the locking lever 432 may be a threaded lever that cooperates with the threaded hole 461. Thus, when the locking lever 432 is rotated within the threaded hole 461, the insert 46 enables the locking member 43 to move toward the inside the slot 413. In one or more embodiments, the locking lever 432 sequentially passes through the passing groove 451 of the guide frame 45, the threaded hole 461 of the insert 46, and the guiding groove 412 of the connecting block 41. When the user rotates the operating portion 431 enabling the locking lever 432 is rotates relative to the insert 46 and rotates around an axis passing through the locking lever 432, the insert 46 guides the locking lever 432 of the locking member 43 through the connecting block 41 and move toward the inside of the connecting block 41, thereby pressing the fence 38 located in the slot 413 or the working table 33.

Figure 44:
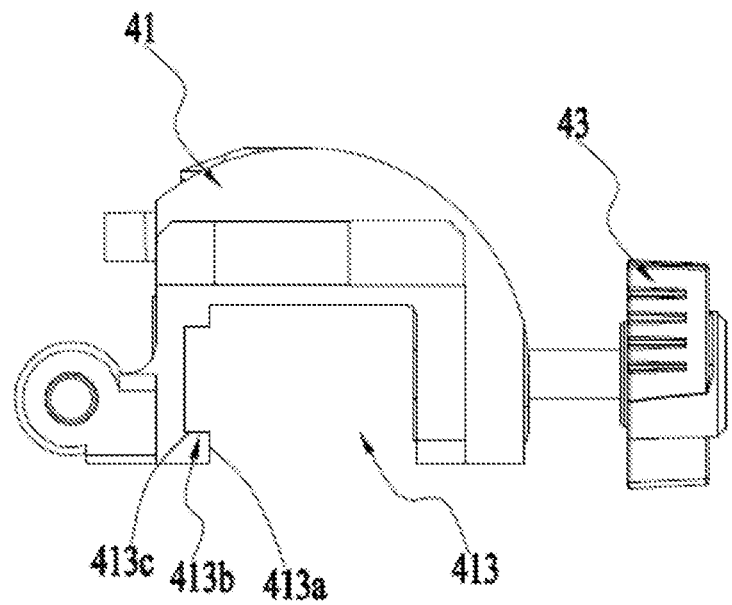
FIG. 44 is a side view of the connecting block and the locking member in FIG. 40.

As illustrated in FIG. 44, the slot 413 is formed with a limiting slot wall 413a. The slot 413 is further formed with a stepping structure 413b at the limiting slot wall 413a, and the stepping structure 413b forms a limiting surface 413c. A wall surface of the limiting slot wall 413a and the limiting surface 413c intersect perpendicularly, and the wall surface of the limiting slot wall 413a is parallel to an axis 302 of a relative rotation of the connecting block 41 and the angle guide body 42. The limiting surface 413c is also connected with the connecting block 41 and the angle guide body 42, and the limiting surface 413c is also parallel to an axis 302 of a relative rotation of the connecting block 41 and the angle guide body 42.

Figure 40:
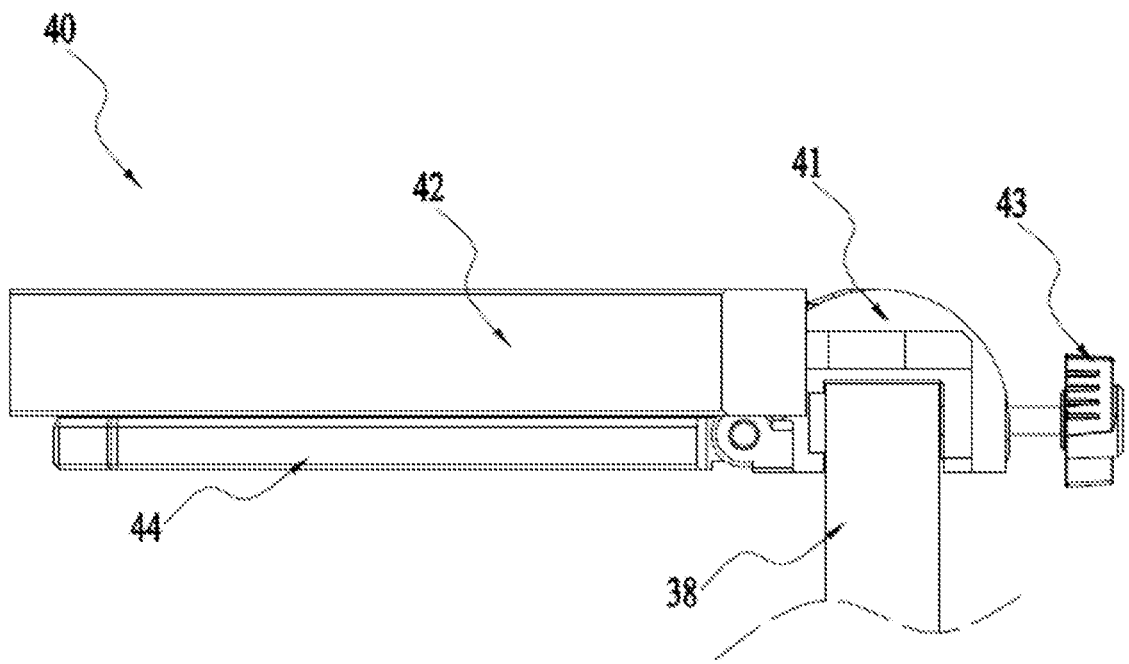
FIG. 40 is a side view of the angle guide assembly and the fence in FIG. 35 when the connecting block is in the first mounting position.
Figure 45:
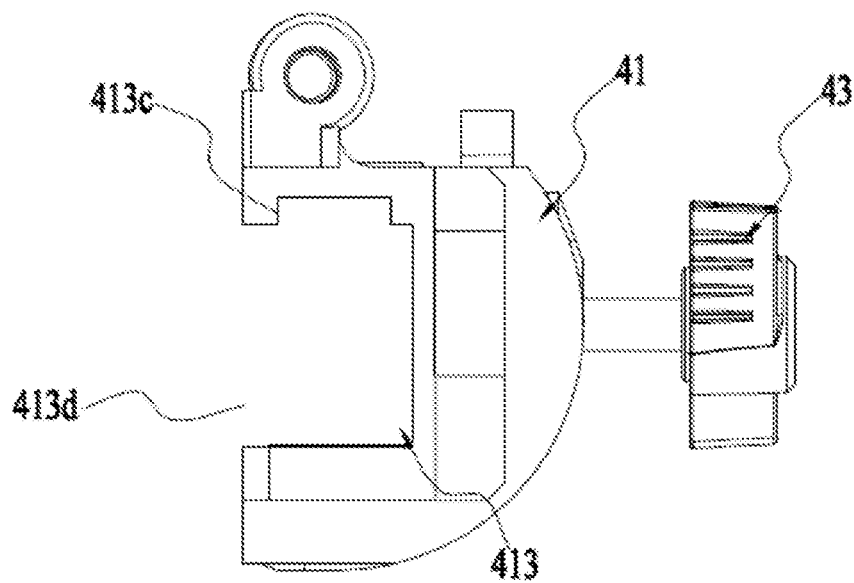
FIG. 45 is a side view of the connecting block and locking member in FIG. 41.

When the connecting block 41 is rotated to the first mounting position shown in FIGS. 40 and 44, the locking member 43 is rotated relative to the connecting block 41 along an extending direction of the guiding groove 412 to a position opposite to the limiting slot wall 413a. Thus, the locking member 43 is engaged with wall surfaces of the limiting slot wall 413a to clamp the abutment the fence 38 from both sides. When the connecting block 41 is rotated to the second mounting position shown in FIGS. 41 and 45, the locking member 43 is rotated relative to the connecting block 41 along the extending direction of the guiding groove 412 to a position opposite to a rebate 413d of the slot 413. At this time, the locking member 43 can cooperate with the limiting surface 413c to clamp the working table 33. As shown in FIG. 41 and FIG. 45, a convex structure 331 capable of cooperating with the limiting surface 413c is formed at the edge of the working table 33.

The basic principles, main features and advantages of the present disclosure have been illustrated and described above. Those skilled in the art should understand that the above embodiments are not intended to limit the present disclosure in any way, and that the technical solutions obtained by equivalent substitution or transformation shall all fall in the scope of the present disclosure.

What is claimed is:

1. A cutting tool, comprising:
   a cutting head for cutting an object;
   a frame supporting the cutting head; and
   a working table for placement of the object proximate the cutting head;
   a water basin mounted to the frame;
   a water tray at least partially disposed between the cutting head and the water basin,
   wherein the water tray comprises at least a portion extending beyond the water basin, and
   wherein the water tray comprises a main water tray slidable relative to the water basin and an extension tray joined with the main water tray via a rotatable connection;
   wherein the water tray at least partially rans beyond the water basin along a direction of the first straight line;
   wherein the water tray is formed or coupled with a guide portion operative to guide the water tray to slide relative to the water basin in a direction parallel to the first straight line; and
   wherein a rotating axis of the extension water tray rotating relative to the main water tray is parallel to the first straight line.

2. The cutting tool according to claim 1, further comprising:
   a guiding rail assembly enabling the working table to slide along a first straight line relative to the frame;
   a fence mounted to the working table and comprising at least one fence surface extending in a direction perpendicular to the first straight line; and
   an extension table detachably mountable to a left side or a right side of the working table;
   wherein the working table comprises:
      a right mounting structure configured to mount the extension table to the right side of the working table; and
      a left mounting structure configured to mount the extension table to the left side of the working table.

3. The cutting tool according to claim 2, wherein when the extension table is mounted to the right side of the working table, a front surface of the extension table faces upward.

4. The cutting tool according to claim 3, further comprising:
   an angle guide assembly detachably mounted to the working table;
   wherein the angle guide assembly comprises:
   a slider slidably mounted to the working table; and
   an angle guide body rotatably connected to the slider;
   wherein the working table is provided with a main chute configured to guide the slider to slide;
   wherein the front surface of the extension table is provided with a front chute configured to dock with the main chute to enable the slider to slide to the extension table when the extension table is mounted to the right side of the working table with the front surface facing upward; and
   the rear surface of the extension table is provided with a rear chute configured to dock with the main chute to enable the slider to slide to the extension table when the extension table is mounted to the left side of the working table with the rear surface facing upward.

5. The cutting tool according to claim 3, wherein the extension table is connected or formed with:
   an extension fence configured to stop the object on the extension table when the extension table is mounted to one side of the working table;
   wherein the fence is substantially aligned with the extension fence when the extension table is mounted to the one side of the working table.

6. The cutting tool according to claim 5, wherein the extension fence has two mounting positions relative the extension table;
   when the extension fence is disposed in one of the two mounting positions, the extension fence protrudes from the front surface of the extension table; and
   when the extension fence is disposed in an other of the two mounting positions, the extension fence protrudes from the rear surface of the extension table.

7. The cutting tool according to claim 2, wherein the fence is detachably connected to the working table.

8. The cutting tool according to claim 7, wherein the working table is provided with a threaded hole, and the fence is detachably mounted to the working table via fitting of a bolt with the threaded hole.

9. The cutting tool according to claim 1, further comprising:
   a supporting assembly supporting one side of the object at a higher position than the working table.

10. The cutting tool according to claim 9, wherein the supporting assembly comprises:
    two supporting legs rotatably connected to the working table; and
    a contacting plate directly contacting the object;
    wherein the contacting plate is disposed between the two support legs.

11. The cutting tool according to claim 1, further comprising:
    an angle guide assembly slidably disposed on the working table along a second straight line;
    wherein the angle guide assembly comprises:
    a guide disc provided with a guiding rail;
    a guide pin sliable along a guiding path of the guiding rail;
    a guide rule connected with the guide disc;
    wherein the guide rule is formed with a abutment surface, wherein the abutment surface is perpendicular to the second straight line when the guide pin is in a first position inside the guiding rail, and obliquely intersects with the second straight line when the guide pin is in a second position inside the guiding rail.

12. The cutting tool according to claim 11, wherein the guiding path of the guiding rail extends along a circular arc.

13. The cutting tool according to claim 12, wherein the working table is provided with a main chute extending along the second straight line; and
    wherein the angle guide assembly comprises:
    a slider slidable along a direction in which the main chute extends.

14. The cutting tool according to claim 13, wherein the angle guide assembly further comprises:
    an insert comprising an extension portion that protrudes in a direction perpendicular to the working table to contact one side of the working table when the slider slides to an edge of the working table.

15. The cutting tool according to claim 14, wherein the guide rule is disposed on a side of the fence surface adjacent to the cutting head; and the gird further defines a notch, at the notch are formed a first auxiliary surface running parallel to or coinciding with the abutment surface and a second auxiliary surface perpendicular to the first auxiliary surface.

16. The cutting tool according to claim 1, further comprising:

a movable member joined with the frame via a movable connection that enables the movable member to switch between a first movable position and a second movable position;

a biased pressing member pressing the movable member in a biased manner to move toward the first movable position; and an operating member to drive the movable member to overcome a biased press of the biased pressing member to move toward the second movable position when operated by a user;

wherein the water basin is further formed with a jointing portion, which is coupled with the movable member when the movable member moves to the first movable position and is disengaged from the movable member when the movable member moves to the second movable position.

17. The cutting tool according to claim 16, wherein the frame comprises:

a pair of transverse beams, one of which supporting the cutting head; and a pair of longitudinal beams connected between the pair of transverse beams, respectively;

wherein the operating member is disposed on the pair of longitudinal beams, and the movable member is disposed at an end portion of the pair of transverse beams.

18. The cutting tool according to claim 17, wherein the operating member further comprises a contacting portion, which is operative to simultaneously contact a hand of the user that is holding the pair of longitudinal beams; wherein the contacting portion is at least partially exposed relative to the frame; and the cutting tool further comprises:

a linking member comprising an active portion connected with the operating member and a driven portion connected with the movable member; and the movable member is a movable pin joined with the frame via a slidable connection; and the jointing portion is a groove which is defined in the water basin and which is operative to be inserted by the movable member when the movable member moves to the first movable position.

* * * * *